United States Patent
He et al.

(10) Patent No.: US 11,898,117 B2
(45) Date of Patent: *Feb. 13, 2024

(54) HIGH TEMPERATURE LUBRICANTS FOR MAGNETIC MEDIA

(71) Applicant: Western Digital Technologies, Inc., San Jose, CA (US)

(72) Inventors: Xingliang He, Fremont, CA (US); Bala Krishna Pathem, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/105,368

(22) Filed: Feb. 3, 2023

(65) Prior Publication Data

US 2023/0250351 A1    Aug. 10, 2023

Related U.S. Application Data

(63) Continuation of application No. 17/193,920, filed on Mar. 5, 2021, now Pat. No. 11,572,519.

(51) Int. Cl.
*C10M 107/38*    (2006.01)
*G11B 5/012*    (2006.01)
(Continued)

(52) U.S. Cl.
CPC ....... *C10M 107/38* (2013.01); *C08G 65/2612* (2013.01); *G11B 5/012* (2013.01);
(Continued)

(58) Field of Classification Search
CPC ............ C10N 2030/06; C10N 2040/18; C10N 2020/04; G11B 5/7375; G11B 5/7257; G11B 2005/0021; G11B 5/6082; G11B 5/012; G11B 5/255; C08G 65/2612; C10M 107/38; C10M 137/16; C10M 105/74;
(Continued)

(56) References Cited

U.S. PATENT DOCUMENTS 6,099,937 A    8/2000  Gui et al.
6,731,446 B2   5/2004  Ikeda et al.
(Continued)

FOREIGN PATENT DOCUMENTS

EP    3555174 A1   10/2019
JP    4654339 B2    3/2011
(Continued)

OTHER PUBLICATIONS

Guo et al., "A multidentate lubricant for use in hard disk drives at sub-nanometer thickness"; Journal of Applied Physics, 2012; https://aip.scitation.org/doi/10.1063/1.3677984; 8 pages.

Guo et al., "Multidentate functionalized lubricant for ultralow head/disk spacing in a disk drive"; Journal of Applied Physics; 2006; https://www.researchgate.net/publication/252269467_Multidentate_functionalized_lubricant_for_ultralow_headdisk_spacing_in_a_disk_drive; 9 pages.

Marchon et al., "Fomblin Multidentate Lubricants for Ultra-Low Magnetic Spacing"; IEEE Transactions on Magnetics; vol. 42, No. 10; Oct. 2006; https://ieeexplore.ieee.org/document/1704346; 4 pages.

(Continued)

*Primary Examiner* — Vishal V Vasisth
(74) *Attorney, Agent, or Firm* — LOZA & LOZA, LLP; Gabriel Fitch

(57) ABSTRACT

High temperature lubricants for magnetic media are provided. One such lubricant includes fluoroalkyl, fluoroalkenyl, perfluoroalkyl, or perfluoroalkyl ether segments, anchoring functional groups engageable with a protective overcoat of a magnetic recording media, and cyclic functional groups. The lubricants can be used in conjunction with a magnetic recording medium and/or a magnetic data storage system.

20 Claims, 12 Drawing Sheets

(51) Int. Cl.
| | |
|---|---|
| *C08G 65/26* | (2006.01) |
| *G11B 5/255* | (2006.01) |
| *G11B 5/725* | (2006.01) |
| *C10N 20/04* | (2006.01) |
| *C10N 50/08* | (2006.01) |
| *G11B 5/00* | (2006.01) |
| *C10N 40/18* | (2006.01) |

(52) U.S. Cl.
CPC ............ *G11B 5/255* (2013.01); *G11B 5/7257* (2020.08); *C10M 2213/043* (2013.01); *C10N 2020/04* (2013.01); *C10N 2040/18* (2013.01); *C10N 2050/08* (2013.01); *G11B 2005/0021* (2013.01)

(58) Field of Classification Search
CPC ........ C10M 2213/04; C10M 2213/043; C10M 2223/08; C10M 2219/00; C10M 2223/083; C10M 2229/051; C10M 2211/042
See application file for complete search history.

(56) References Cited

U.S. PATENT DOCUMENTS

| | | | |
|---|---|---|---|
| 7,715,302 | B2 | 5/2010 | Ohta et al. |
| 8,178,480 | B2 | 5/2012 | Hamakubo et al. |
| 8,787,130 | B1 | 7/2014 | Yuan et al. |
| 9,117,475 | B2 | 8/2015 | Nakata et al. |
| 9,382,496 | B1 | 7/2016 | Knigge et al. |
| 9,466,322 | B2 | 10/2016 | Deng et al. |
| 9,598,657 | B2 | 3/2017 | Isobe et al. |
| 10,262,685 | B2 | 4/2019 | Pathem |
| 10,373,632 | B2 | 8/2019 | Brand et al. |
| 10,766,844 | B2 | 9/2020 | Valsecchi et al. |
| 10,899,883 | B2 | 1/2021 | Galimberti et al. |
| 2003/0176629 | A1 | 9/2003 | Blomquist et al. |
| 2003/0181633 | A1 | 9/2003 | Blomquist et al. |
| 2007/0060487 | A1 | 3/2007 | Burns et al. |
| 2010/0035083 | A1 | 2/2010 | Yang et al. |
| 2011/0117386 | A1 | 5/2011 | Li et al. |
| 2012/0097194 | A1 | 4/2012 | Mcdaniel et al. |
| 2012/0219826 | A1 | 8/2012 | Li et al. |
| 2012/0251843 | A1 | 10/2012 | Yan et al. |
| 2014/0234666 | A1 | 8/2014 | Knigge et al. |
| 2015/0235664 | A1 | 8/2015 | Deng et al. |
| 2015/0361212 | A1 | 12/2015 | Takahashi et al. |
| 2016/0260452 | A1 | 9/2016 | Pathem |
| 2016/0329074 | A1 | 11/2016 | Karis et al. |
| 2017/0260472 | A1 | 9/2017 | Sagata et al. |
| 2018/0268853 | A1 | 9/2018 | Shimokawa et al. |
| 2019/0352573 | A1 | 11/2019 | Hatta et al. |

FOREIGN PATENT DOCUMENTS

| | | |
|---|---|---|
| KR | 20100067037 A | 6/2010 |
| WO | 2015182321 A1 | 12/2015 |
| WO | 2017099075 A1 | 6/2017 |
| WO | 2018159232 A1 | 9/2018 |
| WO | 2021002178 A1 | 1/2021 |

OTHER PUBLICATIONS

Marchon, Bruno, "Lubricant Design Attributes for Subnanometer Head-Disk Clearance"; IEEE Transactions on Magnetics; vol. 45, No. 2; Feb. 2009; https://ieeexplore.ieee.org/document/4782079?reload=true; 6 pages.

Rhew et al., "Thermal Stability of Modified Perfluoropolyether Lubricants for Application in Heat Assisted Magnetic Recording"; Proceedings of the ASME/STLE 2011 International Joint Tribology Conference; 2011; https://doi.org/10.1115/IJTC2011-61044; 2 pages.

Jones et al., "Laser-Induced Thermo-Desorption of Perfluoropolyether Lubricant from the Surface of a Heat-Assisted Magnetic Recording Disk: Lubricant Evaporation and Diffusion"; ResearchGate; Jul. 1, 2015; https://www.researchgate.net/publication/281528079_Laser-Induced_Thermo-Desorption_of_Perfluoropolyether_Lubricant_from_the_Surface_of_a_Heat-Assisted_Magnetic_Recording_Disk_Lubricant_Evaporation_and_Diffusion; 7 pages.

Wu, Lin, "Modelling and simulation of the lubricant depletion process induced by laser heating in heat-assisted magnetic recording system"; IOP Publishing: Nanotechnology; vol. 18, No. 21; Apr. 27, 2007; https://iopscience.iop.org/article/10.1088/0957-4484/18/21/215702/pdf; 9 pages.

Zhang et al., "Lubrication for Heat-Assisted Magnetic Recording Media"; IEEE Transactions on Magnetics; vol. 42, Issue 10, Oct. 2006; https://ieeexplore.ieee.org/document/1704360; 3 pages.

Brunner, Ralf, "Properties of Carbon Overcoats and Perfluoro-Polyether Lubricants in Hard Disk Drives"; Ph.D Dissertation; University of California, San Diego; 2009; https://escholarship.org/uc/item/24w0q2v0; 248 pages.

International Search Report and Written Opinion for International Application No. PCT/US2021/041499, dated Sep. 9, 2021, 13 pages.

International Search Report and Written Opinion for International Application No. PCT/US2021/041500, dated Sep. 14, 2021, 15 pages.

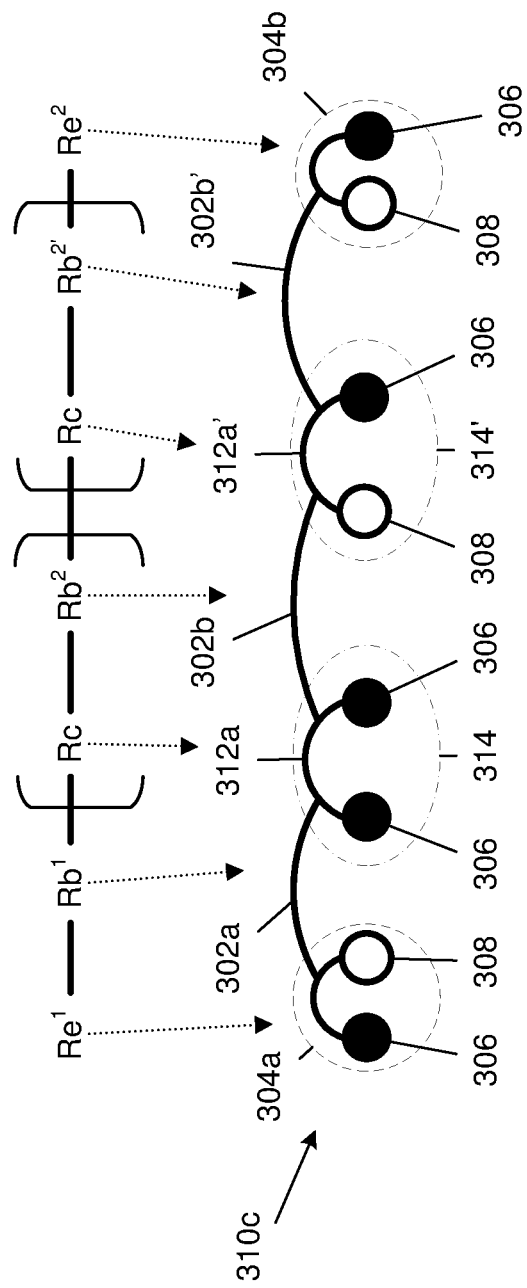

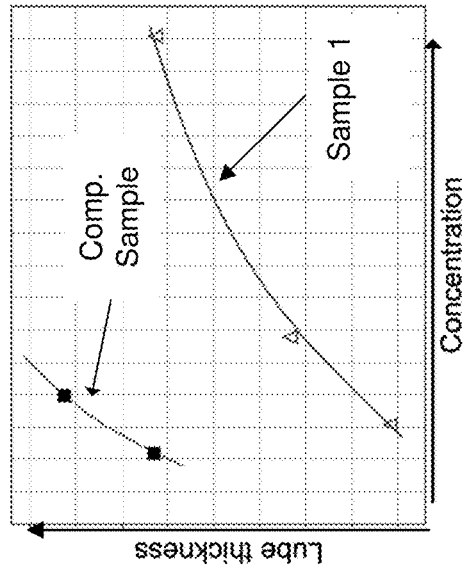
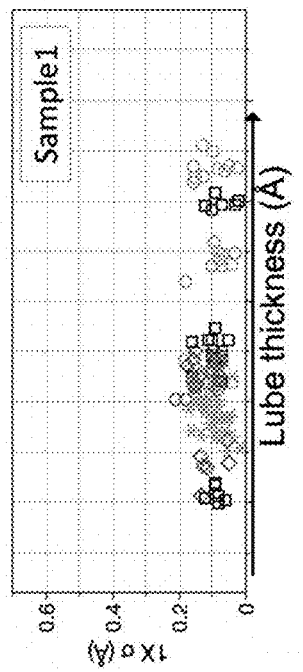
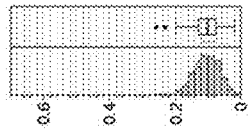
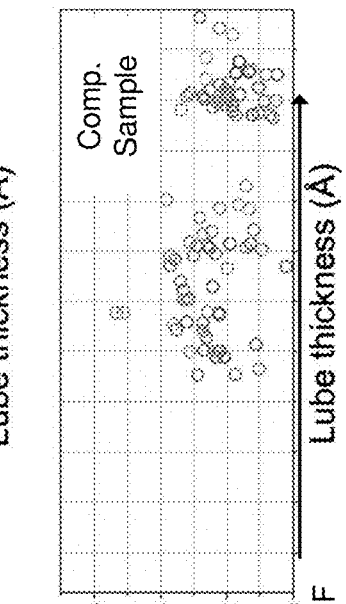
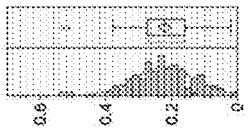
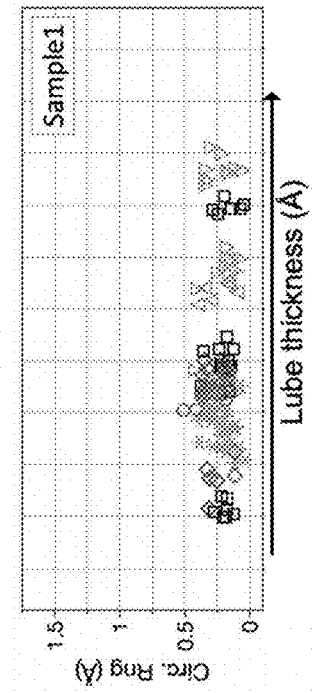

HIGH TEMPERATURE LUBRICANTS FOR MAGNETIC MEDIA

CROSS-REFERENCE TO RELATED APPLICATIONS

This application is a continuation of U.S. patent application Ser. No. 17/193,920, filed Mar. 5, 2021, entitled "HIGH TEMPERATURE LUBRICANTS FOR MAGNETIC MEDIA" and now U.S. Pat. No. 11,572,519, the entire content of which is incorporated herein by reference.

FIELD

The disclosure relates to lubricants, and more particularly, to high temperature lubricants, which may be used with media configured for magnetic recording, e.g., for Heat Assisted Magnetic Recording (HAMR).

INTRODUCTION

Magnetic storage systems, such as a hard disk drive (HDD), are utilized in a wide variety of devices in both stationary and mobile computing environments. Examples of devices that incorporate magnetic storage systems include data center storage systems, desktop computers, portable notebook computers, portable hard disk drives, network storage systems, high definition television (HDTV) receivers, vehicle control systems, cellular or mobile telephones, television set top boxes, digital cameras, digital video cameras, video game consoles, and portable media players.

A typical disk drive includes magnetic storage media in the form of one or more flat disks or platters. The disks generally include two main components, namely, a substrate material that gives it structure and rigidity, and a magnetic media coating that stores the magnetic signals that represent data in a recording layer within the coating. The typical disk drive also includes a read head and a write head, generally in the form of a magnetic transducer which can sense and/or change the magnetic fields stored on the recording layer of the disks. HAMR is a recording technique that can increase the areal density capability (ADC) of written data on a magnetic storage medium having very high coercivity with high-temperature assistance. However, the high recording temperatures applied to the media may present challenges. Other examples of magnetic storage media include flexible tape media usable for magnetic tape recording.

As a result of the high temperatures associated with HAMR technology, suitable lubricants for use in HAMR media may benefit from high thermal stability. In addition, the higher temperatures also increase the presence of contaminants which may negatively affect data storage. As such, there is a need in the art for high temperature lubricants having properties suitable for use in HAMR drives, including the ability to sequester and/or remove contaminants prior to the contaminants interfering with data storage or other operational processes.

SUMMARY

In one aspect, this disclosure provides a lubricant comprising a plurality of segments according to general formula (I), (II), or (III):

$$Re^1\text{—}Rb^1\text{—}Rc\text{—}Rb^2\text{—}Re^2 \quad \text{(I)}$$

$$Re^1\text{—}Rb^1\text{—}Re^2 \quad \text{(II); or}$$

$$Re^1\text{—}Rb^1\text{-}(Rc\text{-}Rb^2)_m\text{—}Re^2 \quad \text{(III);}$$

wherein Rc, when present, is a divalent linking segment comprising an anchoring functional group engageable with a protective overcoat of a magnetic recording media;

wherein each $Rb^1$ and $Rb^2$ when present, independently comprises a chain segment comprising a fluoroalkyl ether moiety, a fluoroalkenyl ether moiety, a perfluoroalkyl ether moiety, a perfluoroalkenyl ether moiety, or a combination thereof;

wherein each of $Re^1$ and $Re^2$ independently comprises an anchoring functional group engageable with a protective overcoat of a magnetic recording media, and wherein one or more of $Re^1$, $Re^2$, and Rc independently comprises a cyclic functional group comprising at least one of an alicyclic $C_3$-$C_{50}$ alkyl radical, an alicyclic $C_3$-$C_{50}$ alkenyl radical, a heterocyclic $C_3$-$C_{50}$ radical, an aromatic $C_5$-$C_{50}$ radical, a polycyclic aromatic $C_{10}$-$C_{50}$ radical, a heteroaromatic $C_5$-$C_{50}$ radical, a cyclotriphosphazine radical, or a combination thereof.

In one aspect, this disclosure provides a magnetic recording medium including a magnetic recording layer on a non-magnetic substrate; a protective overcoat on the magnetic recording layer; and a lubricant layer on the protective overcoat, the lubricant comprising a plurality of segments according to general formula (I), (II), or (III):

$$Re^1\text{-}Rb^1\text{-}Rc\text{-}Rb^2\text{—}Re^2 \quad \text{(I);}$$

$$Re^1\text{—}Rb^1\text{—}Re^2 \quad \text{(II); or}$$

$$Re^1\text{—}Rb^1\text{-}(Rc\text{-}Rb^2)_m\text{—}Re^2 \quad \text{(III);}$$

wherein Rc, when present, is a divalent linking segment comprising an anchoring functional group engageable with a protective overcoat of a magnetic recording media;

wherein each $Rb^1$ and $Rb^2$ when present, independently comprises a chain segment comprising a fluoroalkyl ether moiety, a fluoroalkenyl ether moiety, a perfluoroalkyl ether moiety, a perfluoroalkenyl ether moiety, or a combination thereof;

wherein each of $Re^1$ and $Re^2$ independently comprises an anchoring functional group engageable with a protective overcoat of a magnetic recording media, and wherein one or more of $Re^1$, $Re^2$, and Rc independently comprises a cyclic functional group comprising at least one of an alicyclic $C_3$-$C_{50}$ alkyl radical, an alicyclic $C_3$-$C_{50}$ alkenyl radical, a heterocyclic $C_3$-$C_{50}$ radical, an aromatic $C_5$-$C_{50}$ radical, a polycyclic aromatic $C_{10}$-$C_{50}$ radical, a heteroaromatic $C_5$-$C_{50}$ radical, a cyclotriphosphazine radical, or a combination thereof.

In one aspect, this disclosure also provides a data storage system including a magnetic head; a magnetic recording medium according to any one or more aspects disclosed herein, a drive mechanism for positioning the magnetic head over the magnetic recording medium; and a controller electrically coupled to the magnetic head for controlling operation of the magnetic head.

Other aspects according to the disclosure herein include the following:

A1. A lubricant comprising: a plurality of segments according to general formula (I):

$$Re^1\text{-}Rb^1\text{-}Rc\text{-}Rb^2\text{—}Re^2 \quad \text{(I);}$$

wherein Rc is a divalent linking segment comprising an anchoring functional group engageable with a protective overcoat of a magnetic recording media;

wherein each of $Rb^1$ and $Rb^2$, independently comprises a sidechain segment comprising a fluoroalkyl ether moiety, a fluoroalkenyl ether moiety, a perfluoroalkyl ether moiety, a perfluoroalkenyl ether moiety, or a combination thereof;

wherein one or more of $Re^1$, Rc, and $Re^2$ independently comprises an anchoring functional group engageable with a protective overcoat of a magnetic recording media; and wherein one or more of $Re^1$, $Re^2$, and Rc independently comprises a cyclic functional group comprising at least one of an alicyclic $C_3$-$C_{50}$ alkyl radical, an alicyclic $C_3$-$C_{50}$ alkenyl radical, a heterocyclic $C_3$-$C_{50}$ radical, an aromatic $C_5$-$C_{50}$ radical, a polycyclic aromatic $C_{10}$-$C_{50}$ radical, a heteroaromatic $C_5$-$C_{50}$ radical, a cyclotriphosphazine radical, or a combination thereof.

A2. A lubricant comprising: a plurality of segments according to general formula (II):

$$Re^1—Rb^1—Re^2 \quad (II);$$

wherein $Rb^1$ comprises a chain segment comprising a fluoroalkyl ether moiety, a fluoroalkenyl ether moiety, a perfluoroalkyl ether moiety, a perfluoroalkenyl ether moiety, or a combination thereof;

wherein each of $Re^1$ and $Re^2$ independently comprises an anchoring functional group engageable with a protective overcoat of a magnetic recording media; and wherein one or more of $Re^1$ and $Re^2$ comprises a cyclic functional group comprising at least one of an alicyclic $C_3$-$C_{50}$ alkyl radical, an alicyclic $C_3$-$C_{50}$ alkenyl radical, a heterocyclic $C_3$-$C_{50}$ radical, an aromatic $C_5$-$C_{50}$ radical, a polycyclic aromatic $C_{10}$-$C_{50}$ radical, a heteroaromatic $C_5$-$C_{50}$ radical, a cyclotriphosphazine radical, or a combination thereof.

A3. A lubricant comprising: a plurality of segments according to general formula (III):

$$Re^1—Rb^1-(Rc-Rb^2)_m—Re^2 \quad (III);$$

wherein each Rc is a divalent linking segment comprising an anchoring functional group engageable with a protective overcoat of a magnetic recording media;

wherein each of $Rb^1$ and $Rb^2$, independently comprises a sidechain segment comprising a fluoroalkyl ether moiety, a fluoroalkenyl ether moiety, a perfluoroalkyl ether moiety, a perfluoroalkenyl ether moiety, or a combination thereof;

wherein one or more of $Re^1$, Rc, and $Re^2$ independently comprises an anchoring functional group engageable with a protective overcoat of a magnetic recording media;

wherein one or more of $Re^1$, $Re^2$, and Rc independently comprises a cyclic functional group comprising at least one of an alicyclic $C_3$-$C_{50}$ alkyl radical, an alicyclic $C_3$-$C_{50}$ alkenyl radical, a heterocyclic $C_3$-$C_{50}$ radical, an aromatic $C_5$-$C_{50}$ radical, a polycyclic aromatic $C_{10}$-$C_{50}$ radical, a heteroaromatic $C_5$-$C_{50}$ radical, a cyclotriphosphazine radical, or a combination thereof; and wherein m is from 1 to 20.

A4. The lubricant according to any one of aspects A1 through A3, wherein at least one anchoring functional group, at least one cyclic functional group, or a combination thereof, further comprises at least one of B, Si, a pnictogen, a chalcogen, a halogen, —OR*, —NR*$_2$, —NR*—CO—R* —O—CO—R*, —CO—O—R*, —SeR*, —TeR*, —PR*$_2$, —PO—(OR*)$_2$, —O—PO—(OR*)$_2$, —N=P (NR*$_2$)$_3$, —AsR*$_2$, —SR*, —SO$_2$—(OR*)$_2$, —BR*$_2$, —SiR*$_3$, —(CH$_2$)$_q$-SiR*$_3$, —(CF$_2$)$_q$-SiR*$_3$, or a combination thereof, wherein q is 1 to 10 and each R* is, independently, a hydrogen, B, Si, a pnictogen, a chalcogen, a halogen, a saturated $C_1$-$C_{50}$ radical, an unsaturated $C_2$-$C_{50}$ radical, an aromatic $C_4$-$C_{50}$ radical, a polycyclic aromatic $C_5$-$C_{50}$ radical, a heteroaromatic $C_5$-$C_{50}$ radical, an alicyclic $C_3$-$C_{50}$ radical, and/or a heterocyclic $C_2$-$C_{50}$ radical, and wherein two or more R* may join together to form a ring structure.

A5. The lubricant according to any one of aspects A1 through A4, wherein at least one anchoring functional group comprises a hydroxyl (—OH) moiety.

A6. The lubricant according to any one of aspects A1 through A4, wherein at least one anchoring functional group is a hydroxyl (—OH) moiety.

A7. The lubricant according to any one of aspects A1 through A6, wherein at least one cyclic functional group independently comprises a substituted or unsubstituted monovalent moiety comprising a formula selected from the group consisting of:

(Ia)

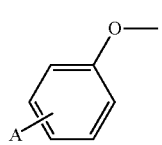
(IIa)

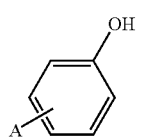
(IIIa)

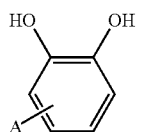
(IVa)

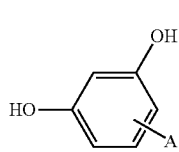
(Va)

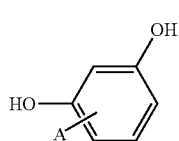
(VIa)

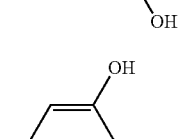
(VIIa)

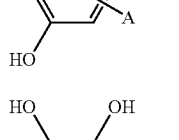
(VIIIa)

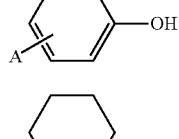
(IXa)

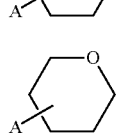
(Xa)

-continued
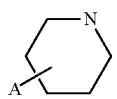
(XIa)
(XIIa)
(XIIIa)
(XIVa)
(XVa)
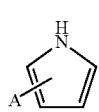
(XVIa)
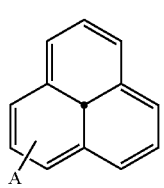
(XVIIa)
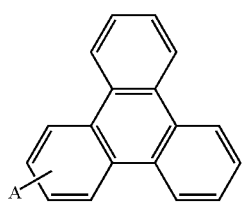
(VIIIa)
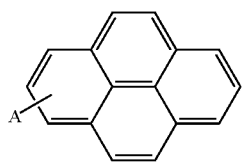
(XIXa)
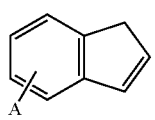
(XXa)
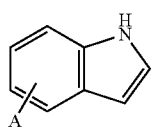
(XXIa)
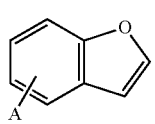
(XXIIa)
-continued
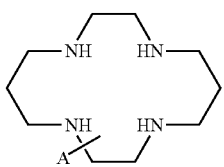
(XXIIIa)
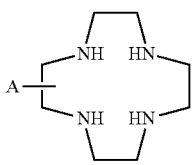
(XXIVa)
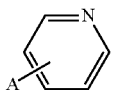
(XXVa)
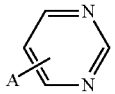
(XXVIa)
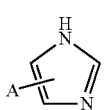
(XXVIIa)
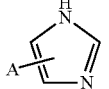
(XXVIIIa)
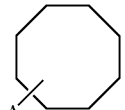
(XXIXa)
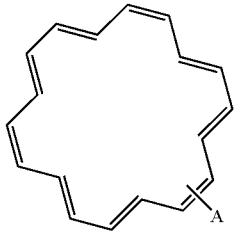
(XXXa)
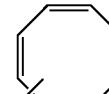
(XXXIa)
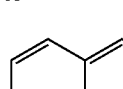
(XXXIIa)
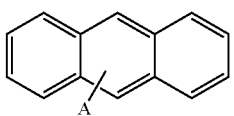
(XXXIIIa)

-continued (XXXIVa)

[Structure: benzene ring with HO, OH, HO, OH, HO, OH substituents and A]

(XXXVa)

[Structure: cyclotriphosphazine ring with OH, OH, HO, HO, OH substituents and A—O]

(XXXVIa)

[Structure: adamantane with A]

or a combination thereof, wherein the moiety is bonded to the respective segment "A" at any substitutable position.

A8. The lubricant according to aspect A7, wherein the cyclic functional group is further substituted with one or more functional groups comprising one or more of B, Si, a pnictogen, a chalcogen, a halogen, —OR*, —NR*$_2$, —NR*—CO—R*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$-SiR*$_3$, —(CF$_2$)$_q$-SiR*$_3$, or a combination thereof, wherein q is 1 to 10 and each R* is, independently, a hydrogen, B, Si, a pnictogen, a chalcogen, a halogen, a saturated $C_1$-$C_{50}$ radical, an unsaturated $C_2$-$C_{50}$ radical, an aromatic $C_4$-$C_{50}$ radical, a polycyclic aromatic $C_5$-$C_{50}$ radical, a heteroaromatic $C_5$-$C_{50}$ radical, an alicyclic $C_3$-$C_{50}$ radical, and/or a heterocyclic $C_2$-$C_{50}$ radical, and wherein two or more R* may join together to form a ring structure.

A9. The lubricant according to any one of aspects A1 through A8, wherein at least one cyclic functional group comprises at least one of a monovalent anisolyl radical, phenolic radical, resorcinolyl radical, catecholyl radical, hydroquinonyl radical, phloroglucinolyl radical, pyrogallolyl radical, phenalenyl radical, indolyl radical, adamantanyl radical, or a combination thereof.

A10. The lubricant according to any one of aspects A1 or A3 through A9, wherein Rc comprises general formula (IV):

wherein each a is, independently from 1 to 20,
wherein each b, when present, is independently from 1 to 20;
wherein p is from 1 to 20; and
wherein at least one $R^1$ is an anchoring functional group engageable with a protective overcoat of a magnetic recording media, comprising B, Si, a pnictogen, a chalcogen, a halogen, —OR*, —NR*$_2$, —NR*—CO—R*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$-SiR*$_3$, —(CF$_2$)$_q$-SiR*$_3$, or a combination thereof, wherein q is 1 to 10 and each R* is, independently, a hydrogen, B, Si, a pnictogen, a chalcogen, a halogen, a saturated $C_1$-$C_{50}$ radical, an unsaturated $C_2$-$C_{50}$ radical, an aromatic $C_4$-$C_{50}$ radical, a polycyclic aromatic $C_5$-$C_{50}$ radical, a heteroaromatic $C_5$-$C_{50}$ radical, an alicyclic $C_3$-$C_{50}$ radical, and/or a heterocyclic $C_2$-$C_{50}$ radical, and wherein two or more R* may join together to form a ring structure.

A11. The lubricant according to aspect A10, wherein at least one $R^1$ is a cyclic functional group comprising an alicyclic $C_3$-$C_{50}$ alkyl radical, an alicyclic $C_3$-$C_{50}$ alkenyl radical, a heterocyclic $C_3$-$C_{50}$ radical, an aromatic $C_5$-$C_{50}$ radical, a polycyclic aromatic $C_{10}$-$C_{50}$ radical, a heteroaromatic $C_5$-$C_{50}$ radical, a cyclotriphosphazine radical, or a combination thereof.

A12. The lubricant according to aspect A11, wherein at least one cyclic functional group further comprises B, Si, a pnictogen, a chalcogen, a halogen, —OR*, —NR*$_2$, —NR*—CO—R*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$-SiR*$_3$, —(CF$_2$)$_q$-SiR*$_3$, or a combination thereof, wherein q is 1 to 10 and each R* is, independently, a hydrogen, B, Si, a pnictogen, a chalcogen, a halogen, a saturated $C_1$-$C_{50}$ radical, an unsaturated $C_2$-$C_{50}$ radical, an aromatic $C_4$-$C_{50}$ radical, a polycyclic aromatic $C_5$-$C_{50}$ radical, a heteroaromatic $C_5$-$C_{50}$ radical, an alicyclic $C_3$-$C_{50}$ radical, and/or a heterocyclic $C_2$-$C_{50}$ radical, and wherein two or more R* may join together to form a ring structure.

A13. The lubricant according to any one of aspects A10 through A12, wherein at least one $R^1$ comprises a hydroxyl moiety (—OH).

A14. The lubricant according to any one of aspects A10 through A12, wherein at least one $R^1$ is a hydroxyl moiety (—OH).

A15. The lubricant according to any one of aspects A1 or A3 through A9, wherein Rc comprises general formula (V):

(IV)

$$—CH_2OCH_2\overset{R^1}{\underset{|}{C}}HCH_2OCH_2\overset{R^1}{\underset{|}{C}}HCH_2OCH_2—(Y)_p—CH_2OCH_2\overset{R^1}{\underset{|}{C}}HCH_2OCH_2\overset{R^1}{\underset{|}{C}}HCH_2OCH_2—;$$

wherein each Y independently comprises:
(i) —CH$_2$—;
(ii) —CF$_2$—;
(iii) —CHF—;
(iv) —CF$_2$CF$_2$CF$_2$O(CF$_2$CF$_2$CF$_2$CF$_2$O)$_a$CF$_2$CF$_2$CF$_2$—;
(v) —CF$_2$CF$_2$O(CF$_2$CF$_2$CF$_2$O)$_a$CF$_2$CF$_2$—;
(vi) —CF$_2$CF$_2$O[CF(CF$_3$)CF$_2$O]$_a$CF$_2$CF$_2$—;
(vii) —CF$_2$O(CF$_2$CF$_2$O)$_a$(CF$_2$O)$_b$CF$_2$—;
(viii) —CF$_2$O(CF$_2$CF$_2$O)$_a$CF$_2$—;
or a combination thereof;

(V)

$$—CH_2OCH_2\overset{R^1}{\underset{|}{C}}H—(Q)_n—\overset{R^1}{\underset{|}{C}}HCH_2OCH_2—;$$

wherein each Q independently comprises:
(i) —CH$_2$—;
(ii) —CF$_2$—;
(iii) —CHF—;
(iv) —CF$_2$CF$_2$CF$_2$O(CF$_2$CF$_2$CF$_2$CF$_2$O)$_a$CF$_2$CF$_2$CF$_2$—;

(v) —CF₂CF₂O(CF₂CF₂CF₂O)ₐCF₂CF₂—;
(vi) —CF₂CF₂O[CF(CF₃)CF₂O]ₐCF₂CF₂—;
(vii) —CF₂O(CF₂CF₂O)ₐ(CF₂O)ᵦCF₂—;
(viii) —CF₂O(CF₂CF₂O)ₐCF₂—;
or a combination thereof;
wherein each a is, independently from 1 to 20,
wherein each b, when present, is independently from 1 to 20;
wherein n is from 1 to 20; and
wherein at least one R¹ is an anchoring functional group engageable with a protective overcoat of a magnetic recording media, comprising B, Si, a pnictogen, a chalcogen, a halogen, —OR*, —NR*₂, —NR*—CO—R*, —O—CO—R*, —CO—O—R*, —SeR*, —TeR*, —PR*₂, —PO—(OR*)₂, —O—PO—(OR*)₂, —N=P(NR*₂)₃, —AsR*₂, —SR*, —SO₂—(OR*)₂, —BR*₂, —SiR*₃, —(CH₂)_q-SiR*₃, —(CF₂)_q-SiR*₃, or a combination thereof, wherein q is 1 to 10 and each R* is, independently, a hydrogen, B, Si, a pnictogen, a chalcogen, a halogen, a saturated C₁-C₅₀ radical, an unsaturated C₂-C₅₀ radical, an aromatic C₄-C₅₀ radical, a polycyclic aromatic C₅-C₅₀ radical, a heteroaromatic C₅-C₅₀ radical, an alicyclic C₃-C₅₀ radical, and/or a heterocyclic C₂-C₅₀ radical, wherein two or more R* may join together to form a ring structure.

A16. The lubricant according to aspect A15, wherein at least one R¹ is a cyclic functional group comprising an alicyclic C₃-C₅₀ alkyl radical, an alicyclic C₃-C₅₀ alkenyl radical, a heterocyclic C₃-C₅₀ radical, an aromatic C₅-C₅₀ radical, a polycyclic aromatic C₁₀-C₅₀ radical, a heteroaromatic C₅-C₅₀ radical, a cyclotriphosphazine radical, or a combination thereof.

A17. The lubricant according to aspect A16, wherein at least one cyclic functional group further comprises B, Si, a pnictogen, a chalcogen, a halogen, —OR*, —NR*₂, —NR*—CO—R*, —O—CO—R*, —CO—O—R*, —SeR*, —TeR*, —PR*₂, —PO—(OR*)₂, —O—PO—(OR*)₂, —N=P(NR*₂)₃, —AsR*₂, —SR*, —SO₂—(OR*)₂, —BR*₂, —SiR*₃, —(CH₂)_q-SiR*₃, —(CF₂)_q-SiR*₃, or a combination thereof, wherein q is 1 to 10 and each R* is, independently, a hydrogen, B, Si, a pnictogen, a chalcogen, a halogen, a saturated C₁-C₅₀ radical, an unsaturated C₂-C₅₀ radical, an aromatic C₄-C₅₀ radical, a polycyclic aromatic C₅-C₅₀ radical, a heteroaromatic C₅-C₅₀ radical, an alicyclic C₃-C₅₀ radical, and/or a heterocyclic C₂-C₅₀ radical, and wherein two or more R* may join together to form a ring structure.

A18. The lubricant according to any one of aspects A15 through A17, wherein at least one R¹ comprises a hydroxyl moiety (—OH).

A19. The lubricant according to any one of aspects A15 through A17, wherein at least one R¹ is a hydroxyl moiety (—OH).

A20. The lubricant according to any one of aspects A1 or A3 through A19, wherein Rc comprises an ester functional group comprising general formula (VI), (VII), or a combination thereof:

(VI)

(VII)

wherein t, when present, is from 1 to 20; and
wherein s, when present, is from 1 to 20.

A21. The lubricant according to any one of aspects A1 through A20, wherein:
Rb¹, and Rb² when present, comprises the formula:
(iv) —CF₂CF₂CF₂O(CF₂CF₂CF₂CF₂O)ₐCF₂CF₂CF₂—;
(v) —CF₂CF₂O(CF₂CF₂CF₂O)ₐCF₂CF₂—;
(vi) —CF₂CF₂O[CF(CF₃)CF₂O]ₐCF₂CF₂—;
(vii) —CF₂O(CF₂CF₂O)ₐ(CF₂O)ᵦCF₂—;
(viii) —CF₂O(CF₂CF₂O)ₐCF₂—;
or a combination thereof;
wherein each a is, independently from 1 to 20, and
wherein each b, when present, is independently from 1 to 20.

A22. The lubricant according to any one of aspects A1 through A21, wherein each of Re¹ and Re² independently comprises general formula (VIII):

wherein at least one R¹ is an anchoring functional group engageable with a protective overcoat of a magnetic recording media, comprising B, Si, a pnictogen, a chalcogen, a halogen, —OR*, —NR*₂, —NR*—CO—R*, —O—CO—R*, —CO—O—R*, —SeR*, —TeR*, —PR*₂, —PO—(OR*)₂, —O—PO—(OR*)₂, —N=P(NR*₂)₃, —AsR*₂, —SR*, —SO₂—(OR*)₂, —BR*₂, —SiR*₃, —(CH₂)_q-SiR*₃, —(CF₂)_q-SiR*₃, or a combination thereof, wherein q is 1 to 10 and each R* is, independently, a hydrogen, B, Si, a pnictogen, a chalcogen, a halogen, a saturated C₁-C₅₀ radical, an unsaturated C₂-C₅₀ radical, an aromatic C₄-C₅₀ radical, a polycyclic aromatic C₅-C₅₀ radical, a heteroaromatic C₅-C₅₀ radical, an alicyclic C₃-C₅₀ radical, and/or a heterocyclic C₂-C₅₀ radical, wherein two or more R* may join together to form a ring structure; and
wherein at least one R¹ is a cyclic functional group comprising an alicyclic C₃-C₅₀ alkyl radical, an alicyclic C₃-C₅₀ alkenyl radical, a heterocyclic C₃-C₅₀ radical, an aromatic C₅-C₅₀ radical, a polycyclic aromatic C₁₀-C₅₀ radical, a heteroaromatic C₅-C₅₀ radical, a cyclotriphosphazine radical, or a combination thereof.

A23. The lubricant according to aspect A22, wherein at least one cyclic functional group further comprises B, Si, a pnictogen, a chalcogen, a halogen, —OR*, —NR*₂, —NR*—CO—R*, —O—CO—R*, —CO—O—R*, —SeR*, —TeR*, —PR*₂, —PO—(OR*)₂, —O—PO—(OR*)₂, —N=P(NR*₂)₃, —AsR*₂, —SR*, —SO₂—(OR*)₂, —BR*₂, —SiR*₃, —(CH₂)_q-SiR*₃, —(CF₂)_q-SiR*₃, or a combination thereof, wherein q is 1 to 10 and each R* is, independently, a hydrogen, B, Si, a pnictogen, a chalcogen, a halogen, a saturated C₁-C₅₀ radical, an unsaturated C₂-C₅₀ radical, an aromatic C₄-C₅₀ radical, a polycyclic aromatic C₅-C₅₀ radical, a heteroaromatic C₅-C₅₀ radical, an alicyclic C₃-C₅₀ radical, and/or a heterocyclic C₂-C₅₀ radical, and wherein two or more R* may join together to form a ring structure.

A24. The lubricant according to aspect A22 or A23, wherein at least one R¹ comprises a hydroxyl moiety (—OH).

A25. The lubricant according to aspect A22 or A23, wherein at least one R¹ is a hydroxyl moiety (—OH).

A26. A lubricant comprising general formula (IX):

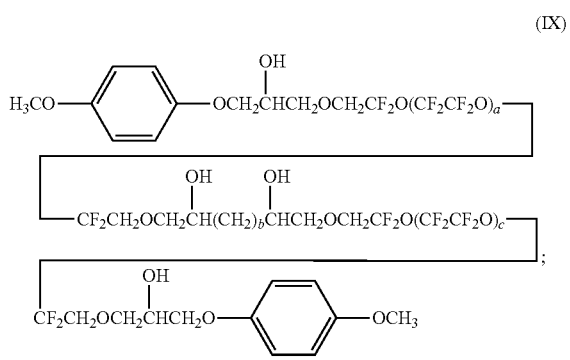

wherein a is from 1 to 20;
wherein b is from 1 to 20; and
wherein c is from 1 to 20.

A27. A lubricant comprising general formula (X):

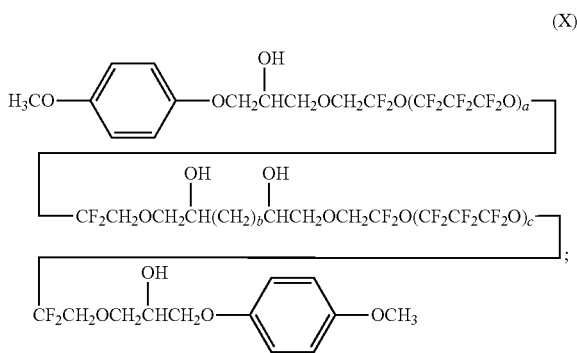

wherein a is from 1 to 20;
wherein b is from 1 to 20; and
wherein c is from 1 to 20.

A28. The lubricant according to any one of aspects A1 through A28, comprising a weight average molecular weight from about 0.1 to 20 kiloDaltons (kDa) and a polydispersity of greater than or equal to about 1 and less than or equal to about 2.

A29. The lubricant according to any one of aspects A1 through A28, comprising a dewetting thickness of less than or equal to about 10 nanometers.

A30. A magnetic recording medium, comprising:
a magnetic recording layer on a non-magnetic substrate;
a protective overcoat on the magnetic recording layer; and
a lubricant layer comprising the lubricant according to any one of aspects A1 through A29 on the protective overcoat.

A31. The magnetic recording medium according to aspect A30, wherein the lubricant layer comprises a thickness of less than or equal to about 10 nanometers.

A32. The magnetic recording medium according to aspect A30 or A31, wherein the lubricant has a bonding percentage of about 20% to less than about 100%, corresponding to a degree of bonding of the lubricant to the total area of an upper surface of the protective overcoat.

A33. A data storage system, comprising:
at least one magnetic head;
a magnetic recording medium comprising a lubricant according to any one of aspects A1 through A29;
a drive mechanism for positioning the at least one magnetic head over the magnetic recording medium; and
a controller electrically coupled to the at least one magnetic head for controlling operation of the at least one magnetic head.

A34. A data storage system, comprising:
a slider comprising at least one magnetic head and an air bearing surface (ABS), wherein a lubricant according to any one of aspects A1 through A29 is disposed on the ABS; and
a magnetic recording medium comprising a magnetic recording layer;
wherein the slider is configured to write information to the magnetic recording layer using heat assisted magnetic recording (HAMR) technology.

Other aspects and advantages of the present disclosure will become apparent from the following detailed description and examples, when considered in conjunction with the drawings.

BRIEF DESCRIPTION OF THE DRAWINGS

FIG. 3E is a schematic drawing showing a lubricant according to general formula (III) of the disclosure comprising two chain segments comprising terminal cyclic functional groups and separated by a linking segment according to one aspect of the disclosure;

FIG. 9A is a graph showing the processability of a lubricant according to one aspect of the disclosure indicated by lube thickness versus lube concentration;

FIG. 9B is a graph showing the processability of a lubricant according to one aspect of the disclosure indicated by circumferential lube thickness ranges versus lube thickness for the selected high-temperature lubricant sample 1;

FIG. 9C is a graph showing the processability of a lubricant according to one aspect of the disclosure indicated by lube thickness standard deviation of the selected high-temperature lubricant sample 1 versus its lube thickness;

FIG. 9D is a statistical summary of the data shown in FIG. 9C;

FIG. 9E is a graph showing the circumferential lube thickness ranges versus lube thickness for the comparative sample;

FIG. 9F is a graph showing lube thickness standard deviation of the comparative sample versus its lube thickness;

FIG. 9G is a statistical summary of the data shown in FIG. 9F;

DETAILED DESCRIPTION

Figure 1A:
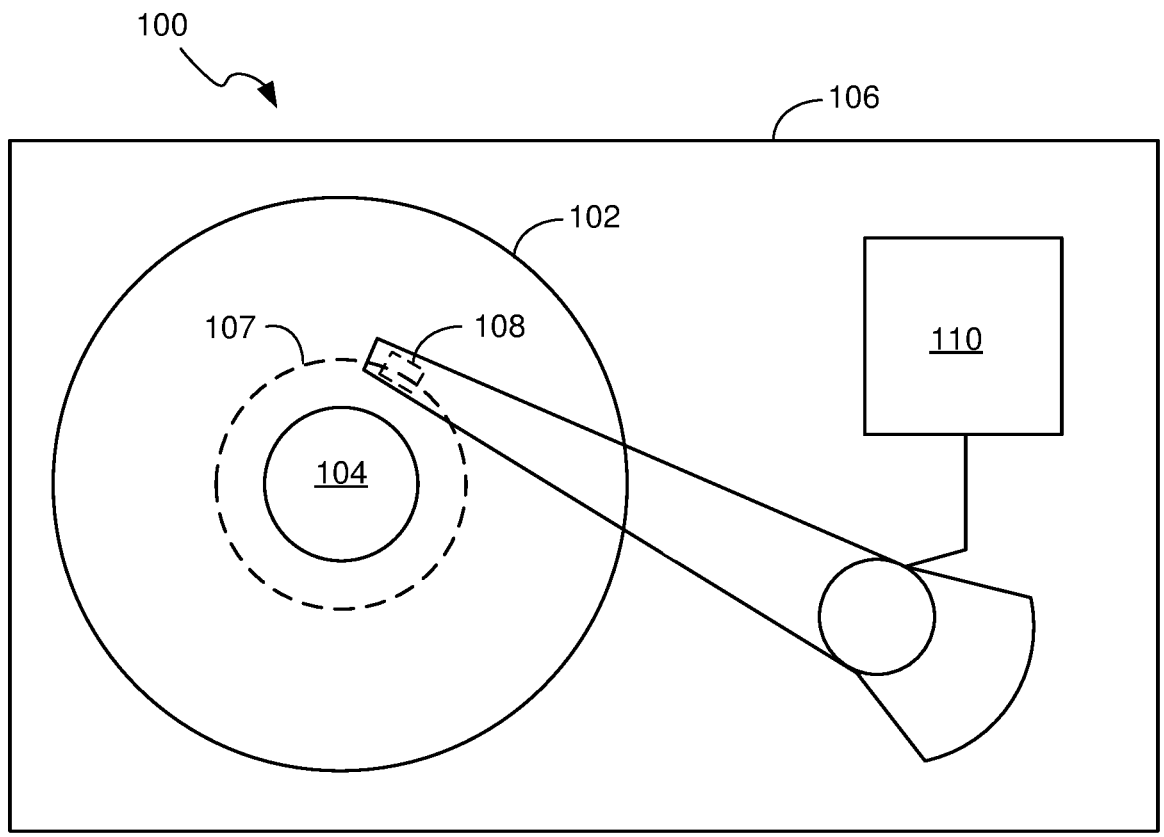
FIG. 1A is a diagram schematically illustrating a data storage device including a slider and a magnetic recording medium in accordance with one aspect of the disclosure.

Heat Assisted Magnetic Recording (HAMR) systems operate at substantially higher temperatures than traditional magnetic recording systems. HAMR is an example of magnetic recording within the class of Energy Assisted Magnetic Recording (EAMR) techniques, where conventional magnetic recording is supplemented by other energy used in the system. Other examples of EAMR may include Microwave Assisted Magnetic Recording (MAMR) and applications of electric current into various conductive and/or magnetic structures near the main pole. This disclosure is generally directed to lubricants having high thermal stability that can be used in conjunction with a magnetic recording medium and/or a magnetic data storage system including a HAMR, or more generally EAMR, magnetic recording medium or storage system.

In one aspect, such a lubricant comprises or is according to general formula (I) or (III):

$Re^1-Rb^1-Rc-Rb^2-Re^2$ (I); or

$Re^1-Rb^1-(Rc-Rb^2)_m-Re^2$ (III);

which comprises a divalent center or linking segment Rc comprising at least one anchoring functional group. Rc is disposed between two chain segments $Rb^1$ and $Rb^2$, which are also referred to as sidechain segments in these arrangements. Each of $Rb^1$ and $Rb^2$ comprise a fluoroalkyl ether moiety, a fluoroalkenyl ether moiety, a perfluoroalkyl ether moiety, a perfluoroalkenyl ether moiety, or a combination thereof. In general formula (III), m may be from 1 to 20, or from 1 to 10, or from 1 to 5.

The side chain segments are terminated with one of the end group segments $Re^1$ and $Re^2$. Each end group segment $Re^1$ and $Re^2$ includes at least one anchoring functional group which is selected to be attachable and/or engageable with a protective overcoat of a magnetic recording media, and a cyclic functional group comprising at least one of an alicyclic $C_3$-$C_{50}$ alkyl radical, an alicyclic $C_3$-$C_{50}$ alkenyl radical, a heterocyclic $C_3$-$C_{50}$ radical, an aromatic $C_5$-$C_{50}$ radical, a polycyclic aromatic $C_{10}$-$C_{50}$ radical, a heteroaromatic $C_5$-$C_{50}$ radical, a cyclotriphosphazine radical, or a combination thereof.

The center or linking segment Rc may also comprise at least one anchoring functional group which is selected to be attachable and/or engageable with a protective overcoat of a magnetic recording media, and may further include a cyclic functional group comprising at least one of an a cyclic functional group comprising at least one of an alicyclic $C_3$-$C_{50}$ alkyl radical, an alicyclic $C_3$-$C_{50}$ alkenyl radical, a heterocyclic $C_3$-$C_{50}$ radical, an aromatic $C_5$-$C_{50}$ radical, a polycyclic aromatic $C_{10}$-$C_{50}$ radical, a heteroaromatic $C_5$-$C_{50}$ radical, a cyclotriphosphazine radical, or a combination thereof.

The multi-dentate structure of the lubricant provides improved levels of head wear, lube pickup, and other properties including improved mechanical integration robustness. The presence of the cyclic functional groups increases thermal stability and reduces the contamination vulnerability when compared with lubricants known in the art.

In another aspect, the lubricant has general formula (II):

$Re^1-Rb^1-Re^2$ (II);

and may include a main chain segment $Rb^1$ comprising a fluoroalkyl ether moiety, a fluoroalkenyl ether moiety, a perfluoroalkyl ether moiety, a perfluoroalkenyl ether moiety, or a combination thereof disposed between two mono-valent end group segments $Re^1$ and $Re^2$ as defined with respect to general formulas (I) and (III).

Definitions

For purposes herein, and the claims thereto, the new numbering scheme for the Periodic Table Groups is used as described in Chemical and Engineering News, 63(5), pg. 27 (1985). Therefore, a "group 4 metal" is an element from group 4 of the Periodic Table, e.g. Hf, Ti, or Zr.

As used herein, and unless otherwise specified, the term "$C_n$" means hydrocarbon(s) having n carbon atom(s) per molecule, where n is a positive integer. Likewise, a "$C_m$–$C_y$" group or compound refers to a group or compound comprising carbon atoms at a total number thereof in the range from m to y. Thus, a $C_1$-$C_4$ alkyl group refers to an alkyl group that includes carbon atoms at a total number thereof in the range of 1 to 4, e.g., 1, 2, 3 and 4.

"Moiety" refers to one or more covalently bonded atoms which form a part of a molecule. The terms "group," "radical," "moiety", and "substituent" may be used interchangeably.

The terms "hydrocarbyl radical," "hydrocarbyl group," or "hydrocarbyl" may be used interchangeably and are defined to mean a group consisting of hydrogen and carbon atoms only. Preferred hydrocarbyls are $C_1$-$C_{50}$ radicals that may be linear, branched, or cyclic, and when cyclic, aromatic or non-aromatic. Examples of such radicals include, but are not limited to, alkyl groups such as methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like, aryl groups, such as phenyl, benzyl naphthyl, and the like.

For purposes herein, a heteroatom is any non-carbon atom, selected from groups 13 through 17 of the periodic table of the elements. In one or more aspects, heteroatoms are non-metallic atoms selected from B, Si, pnictogens (N, P, As, Sb, Bi), chalcogen (O, S, Se, Te), and halogens (F, Cl, Br, I).

Unless otherwise indicated, the term "substituted" means that at least one hydrogen atom has been replaced with at least one non-hydrogen atom or a functional group.

For purposes herein, when a segment comprises or includes a particular moiety, it is to be understood that the moiety may be bonded to the respective segment at any substitutable position in which a hydrogen atom may be replaced with a chemical bond between the moiety and the segment.

For purposes herein, a functional group includes one or more of a hydrocarbyl group, a heteroatom, or a heteroatom containing group, such as B, Si, pnictogen, chalcogen, or halogen (such as Br, $C_1$, F or I), at least one of —OR*, —NR*$_2$, —NR*—CO—R*, —OR*,*—O—CO—R*, —CO—O—R*, —SeR*, —TeR*, —PR*$_2$, —PO—(OR*)$_2$, —O—PO—(OR*)$_2$, —AsR*$_2$, —SbR*$_2$, —SR*, —SO$_2$—(OR*)$_2$, —BR*$_2$, —SiR*$_3$, —(CH$_2$)q-SiR*$_3$, or a combination thereof, wherein q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure, or where at least one heteroatom has been inserted within a hydrocarbyl ring.

In one or more aspects, functional groups may include: a saturated $C_1$-$C_{50}$ radical, an unsaturated $C_1$-$C_{50}$ radical, an alicyclic $C_3$-$C_{50}$ radical, a heterocyclic $C_3$-$C_{50}$ radical, an aromatic $C_5$-$C_{50}$ radical, a heteroaromatic $C_5$-$C_{50}$ radical, a cyclotriphosphazine radical, a B, Si, pnictogen, chalcogen, or halogen, —OR*, —NR*$_2$, —NR*—CO—R*, —OR*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)q-SiR*$_3$, —(CF$_2$)q-SiR*$_3$, or a combination thereof, wherein q is 1 to 10 and each R* is, independently a hydrogen, a pnictogen, a chalcogen, a halogen, a saturated, unsaturated, aromatic, polycyclic aromatic, heteroaromatic, alicyclic, and/or heterocyclic $C_4$-$C_{50}$ radical.

For purposes herein, a cyclic functional group is a monovalent alicyclic $C_3$-$C_{50}$ alkyl radical, an alicyclic $C_3$-$C_{50}$ alkenyl radical, a heterocyclic $C_3$-$C_{50}$ radical, an aromatic $C_5$-$C_{50}$ radical, a polycyclic aromatic $C_{10}$-$C_{50}$ radical, a heteroaromatic $C_5$-$C_{50}$ radical, a cyclotriphosphazine radical, or a combination thereof. Unless otherwise indicated, the cyclic functional group may be further substituted with another cyclic functional group and/or with one or more functional groups comprising one or more of a saturated $C_1$-$C_{50}$ radical, an unsaturated $C_1$-$C_{50}$ radical, an alicyclic $C_3$-$C_{50}$ radical, a heterocyclic $C_3$-$C_{50}$ radical, an aromatic $C_5$-$C_{50}$ radical, a heteroaromatic $C_5$-$C_{50}$ radical, a cyclotriphosphazine radical, a B, Si, pnictogen, chalcogen, or halogen, —OR*, —NR*$_2$, —NR*—CO—R*, —OR*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)q-SiR*$_3$, —(CF$_2$)q-SiR*$_3$, or a combination thereof, wherein q is 1 to 10 and each R* is, independently a hydrogen, a pnictogen/chalcogen/halogen, a saturated, unsaturated, aromatic, polycyclic aromatic, heteroaromatic, alicyclic, and/or heterocyclic $C_1$-$C_{50}$ radical.

For purposes as described herein, a functional group which is selected for being attachable to and/or engageable with a protective overcoat of a magnetic recording media refers to a functional group having increased affinity for the protective overcoat of a magnetic recording media relative to the affinity of the a fluoroalkenyl ether moiety, a perfluoroalkyl ether moiety, a perfluoroalkenyl ether moieties, to that same surface. Increased affinity may include Van der Waals forces, weak London Dispersion forces, dipole-dipole forces, polar interactions, polarizability/hydrogen bonding interactions, and/or the like, and/or may include the formation of one or more types of bonds, backbonding, and/or dative bonds with the protective overcoat of a recording media. In one or more aspects, a functional group which is attachable to and/or engageable with a protective overcoat of a magnetic recording media refers to one or more functional groups having increased affinity for the carbon overcoat (COC) layer of the recording media, relative to the affinity of a fluoroalkenyl ether moiety, a perfluoroalkyl ether moiety, a perfluoroalkenyl ether moieties to that same surface. In some aspects, functional groups attachable to and/or engageable with a protective overcoat of a magnetic recording media include radicals comprising one or more hydroxyl moieties (—OH), or consisting of a hydroxyl moiety (—OH).

A heterocyclic ring, also referred to herein as a heterocyclic radical, is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring. A substituted heterocyclic ring is a heterocyclic ring where a hydrogen of one of the ring atoms is substituted, e.g., replaced with a hydrocarbyl, or a heteroatom containing group.

A "compound" refers to a substance formed by the chemical bonding of a plurality chemical elements. A "derivative" refers to a compound in which one or more of the atoms or functional groups of a precursor compound have been replaced by another atom or functional group, generally by means of a chemical reaction having one or more steps.

In aspects comprising a single "chain segment", e.g., a plurality of segments according to general formula (II):

the chain segment Rb$^1$ may also be referred to herein as a "main chain segment", when only a single chain segment is present. In aspects comprising a multiple "chain segments", e.g., a plurality of segments according to general formula (I) and/or general formula (III):

each chain segment Rb$^1$ and Rb$^2$ may also be referred to herein as a "side chain segment" when disposed on either side of a center segment. A chain segment refers to a divalent chemical moiety comprising one or more perfluoro carbon atoms, which may include one or more of a fluoroalkyl ether moiety, a fluoroalkenyl ether moiety, a perfluoroalkyl ether moiety, a perfluoroalkenyl ether moiety, or a combination thereof, chemically bonded to one-another between an which terminate on at least one end group, also referred to herein as an end segment e.g., $Re^1$ and $Re^2$. The "end group," or "end segment" generally abbreviated Re, refers to a mono-valent radical located at an end of a chain segment comprising an anchoring functional group engageable with a protective overcoat of a magnetic recording media; a cyclic functional group comprising at least one of an alicyclic $C_3$-$C_{50}$ alkyl radical, an alicyclic $C_3$-$C_{50}$ alkenyl radical, a heterocyclic $C_3$-$C_{50}$ radical, an aromatic $C_5$-$C_{50}$ radical, a polycyclic aromatic $C_{10}$-$C_{50}$ radical, a heteroaromatic $C_5$-$C_{50}$ radical, a cyclotriphosphazine radical, or a combination thereof. In some aspects, one or more of the end segments Re comprise both an anchoring functional group and a cyclic functional group.

Fluorinated alkyl ethers including fluoroalkyl ethers, fluoroalkenyl ethers, perfluoroalkyl ethers, perfluoroalkenyl ethers, or combinations thereof, refer to branched or linear chain of $C_1$ to $C_{20}$ alkyl ethers in which one or more hydrogen atoms are substituted with fluorine. In one aspect, all or a majority of alkyl hydrogen atoms are substituted with fluorine.

For any particular compound disclosed herein, any general or specific structure presented also encompasses all conformational isomers, regio-isomers, and stereoisomers that may arise from a particular set of substituents, unless stated otherwise. Similarly, unless stated otherwise, the general or specific structure also encompasses all enantiomers, diastereomers, and other optical isomers whether in enantiomeric or racemic forms, as well as mixtures of stereoisomers, as would be recognized by a skilled artisan.

As used herein, the term "aromatic" also refers to pseudo-aromatic heterocycles which are heterocyclic substituents that have similar properties and structures (nearly planar) to aromatic heterocyclic ligands, but are not by definition aromatic; likewise the term aromatic also refers to substituted aromatics.

As used herein, a moiety which is chemically identical to another moiety is defined as being identical in overall composition exclusive of isotopic abundance and/or distribution, and/or exclusive of stereochemical arrangement such as optical isomers, confirmational isomers, spatial isomers, and/or the like.

HAMR System for Employing Lubricant

FIG. 1A is a top schematic view of a data storage device 100 (e.g., disk drive or magnetic recording device) configured for heat assisted magnetic recording (HAMR) including a slider 108 and a magnetic recording medium 102 having a lubricant according to one or more aspects of the disclosure. The laser (not visible in FIG. 1A but see 114 in FIG. 1B) is positioned with a head/slider 108. Disk drive 100 may include one or more disks/media 102 to store data. Disk/media 102 resides on a spindle assembly 104 that is mounted to a drive housing. Data may be stored along tracks in the magnetic recording layer of disk 102. The reading and writing of data is accomplished with the head 108 (slider) that may have both read and write elements (108a and 108b). The write element 108a is used to alter the properties of the magnetic recording layer of disk 102 and thereby write information thereto. In one aspect, head 108 may have magneto-resistive (MR), giant magneto-resistive (GMR), or tunnel magneto-resistive (TMR) elements. In an alternative aspect, head 108 may be another type of head, for example, a Hall effect head. In operation, a spindle motor (not shown) rotates the spindle assembly 104, and thereby rotates the disk 102 to position the head 108 at a particular location along a desired disk track 107. The position of the head 108 relative to the disk 102 may be controlled by the control circuitry 110 (e.g., a microcontroller). It is noted that while an example HAMR system is shown, the various embodiments described may be used in other EAMR or non-EAMR magnetic data recording systems, including perpendicular magnetic recording (PMR) disk drives or magnetic tape drives.

Figure 1B:
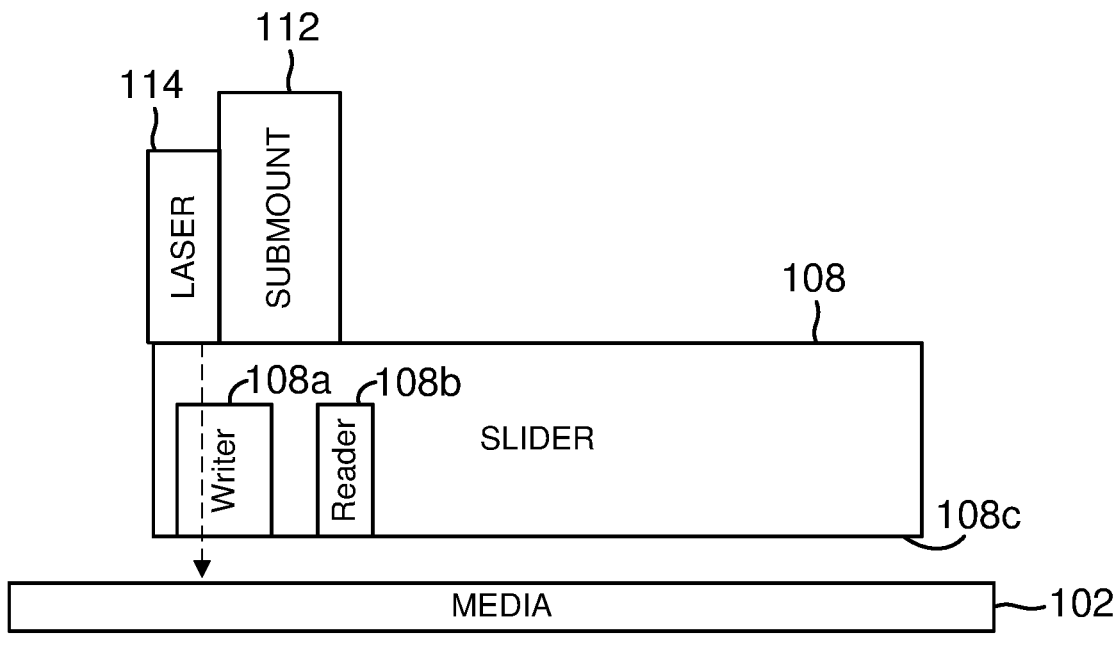
FIG. 1B is a side schematic view of the slider and magnetic recording medium of FIG. 1A in accordance with one aspect of the disclosure.

FIG. 1B is a side schematic view of the slider 108 and magnetic recording medium 102 of FIG. 1A. The magnetic recording medium 102 includes a lubricant layer (see FIG. 2) in accordance with one or more aspects of the disclosure. The slider 108 may include a sub-mount 112 attached to a top surface of the slider 108. The laser 114 may be attached to the sub-mount 112, and possibly to the slider 108. The slider 108 includes a write element (e.g., writer) 108a and a read element (e.g., reader) 108b positioned along an air bearing surface (ABS) 108c of the slider for writing information to, and reading information from, respectively, the media 102. In other aspects, the slider may also include a layer of the lubricant (not shown).

In operation, the laser 114 is configured to generate and direct light energy to a waveguide (possibly along the dashed line) in the slider which directs the light to a near field transducer (NFT) near the air bearing surface (e.g., bottom surface) 108c of the slider 108. Upon receiving the light from the laser 114 via the waveguide, the NFT generates localized heat energy that heats a portion of the media 102 near the write element 108a and the read element 108b. The anticipated recording temperature is in the range of about 350° C. to 400° C. In the aspect illustrated in FIG. 1B, the laser directed light is disposed between the writer 108a and a trailing edge of the slider. In other aspects, the laser directed light may instead be positioned between the writer 108a and the reader 108b. FIGS. 1A and 1B illustrate a specific aspect of a HAMR system. In other aspects, the magnetic recording medium 102 with the lubricant layer according to aspects of the disclosure can be used in other suitable HAMR systems (e.g., with other sliders configured for HAMR).

Figure 2:
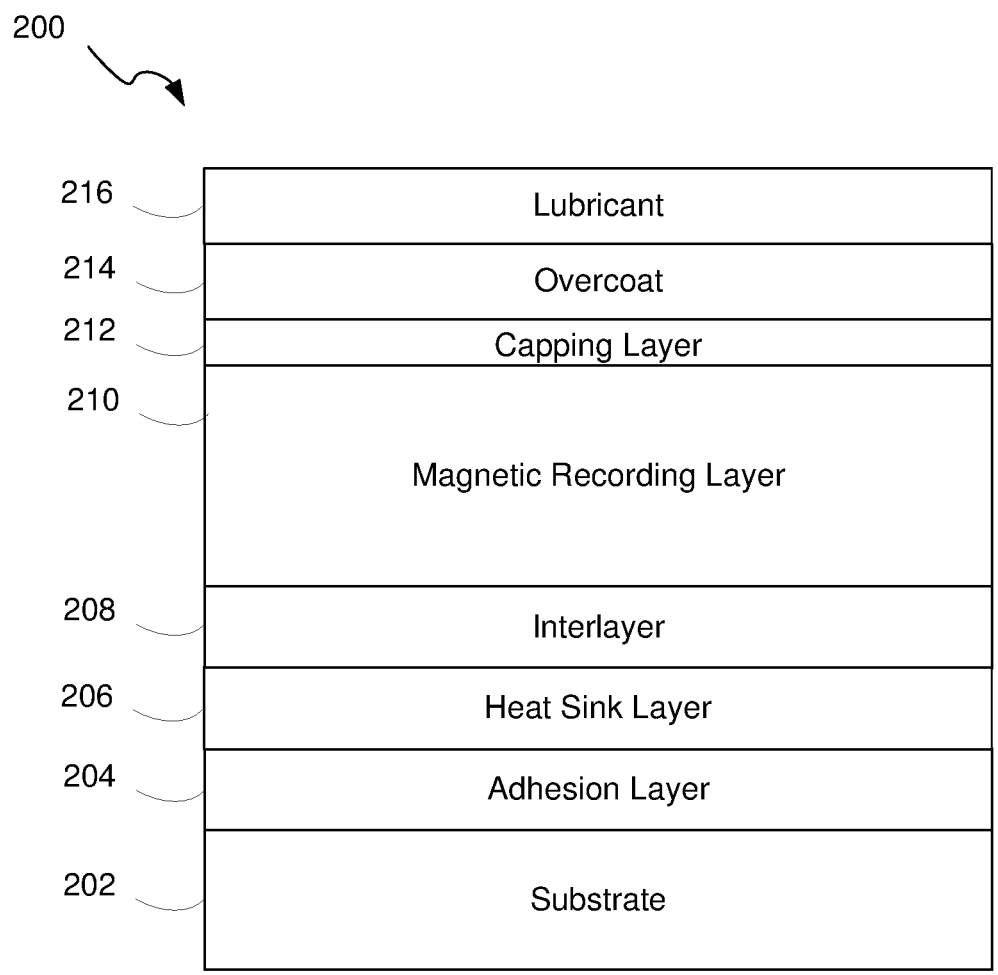
FIG. 2 is a side schematic view of a head assisted magnetic recording (HAMR) medium in accordance with one aspect of the disclosure.

FIG. 2 is a side schematic view of a magnetic recording medium 200 having a lubricant layer according to one or more aspects of the disclosure. In one aspect, the magnetic recording medium 200 may be used in a HAMR system (e.g., disk drive 100). The magnetic recording medium 200 has a stacked structure with a substrate 202 at a bottom/base layer, an adhesion layer 204 on the substrate 202, a heat sink layer 206 on the adhesion layer 204, an interlayer 208 on the heat sink layer 206, a magnetic recording layer (MRL) 210 on the interlayer 208, a capping layer 212 on the MRL 210, an overcoat layer 214 on the capping layer 212, and a lubricant layer 216 on the overcoat layer 214. In one aspect, the magnetic recording medium 200 may have a soft magnetic underlayer (SUL) between the adhesion layer 204 and the heat sink layer 206. In one aspect, the magnetic recording medium 200 may have a thermal resistance layer (TRL) between the interlayer 208 and the heat sink layer 206. In one aspect, for disk drive applications, the substrate 202 can be made of one or more materials such as an Al alloy, NiP plated Al, glass, glass ceramic, and/or combinations thereof. In one aspect for magnetic tape recording applications, the substrate 202 can include a flexible material, such a film made of one of various types of resins, polyesters, polyolefins, polyamides, and the like, or combinations thereof. The substrate may include non-magnetic materials, and may be laminated. In some aspects, the magnetic recording medium 200 may have some or all of the layers illustrated in FIG. 2 and/or additional layer(s) in various stacking orders. It should also be noted that each layer shown in FIG. 2 may include one or more sub-layers. For example, the magnetic recording layer may comprise a multiple layers in certain embodiments.

Lubricants

Lubricants according to aspects disclosed herein may function as boundary lubricants which may be used in various mechanical devices, including on the magnetic media of hard disk drives or tape drives and in conjunction with other microelectronic mechanical systems. Boundary lubricants may form a lubricant layer when one or more functional groups of the lubricant attach or otherwise engage with the surface being lubricated. For instance, one or more boundary lubricants may form the lubricant layer 216 on magnetic recording medium 200 (e.g., a disk that includes a magnetic recording layer 210) that moves relative to other parts in the magnetic storage device. This lubricant layer 216 may help to protect the magnetic recording medium from friction, wear, contaminations, smearing, and/or damages caused by interactions between the magnetic recording medium and other parts in the storage device (e.g., interactions between a slider and the magnetic recording medium). In other words, this boundary layer may help limit solid-to-solid contact.

Lubricant Characteristics

Figure 3A:
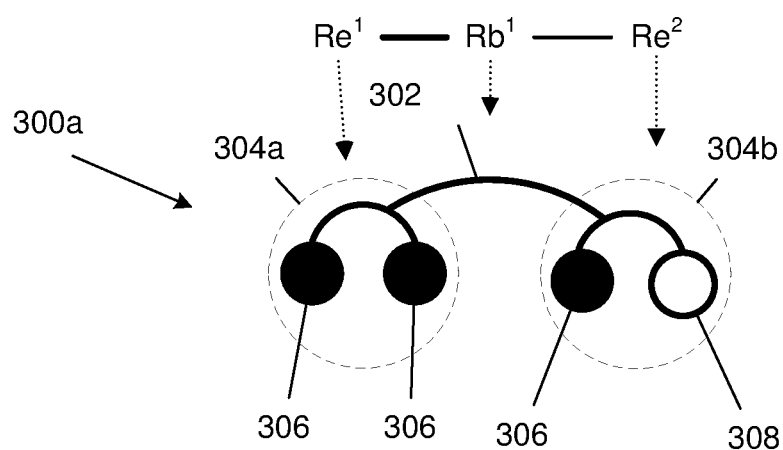
FIG. 3A is a schematic drawing showing a lubricant according to general formula (II) of the disclosure comprising a single main chain segment and a cyclic functional group according to one aspect of the disclosure.

FIG. 3A-3D illustrate boundary lubricants according to aspects of the disclosure. In one aspect as shown in FIG. 3A, the boundary lubricant generally referred to as 300a comprises or may have general formula (II):

wherein $Rb^1$ (302) comprises or is a chain segment including a fluoroalkyl, fluoroalkenyl, perfluoroalkyl, or perfluoroalkyl ether moiety bonded on either side to an end segment 304a and 304b. In the aspect shown in FIG. 3A, the chain segment $Rb^1$ (302) may be also be referred to as a main chain segment. Each of $Re^1$ (304a) and $Re^2$ (304b) are end segments which independently includes an anchoring functional group 306 selected for being attachable to and/or engageable with a protective overcoat of a magnetic recording media (see FIG. 2). In the aspect shown, one or more of the end segments $Re^1$ (304a) and $Re^2$ (304b) includes a cyclic functional group 308 comprising an alicyclic $C_3$-$C_{50}$ alkyl radical, an alicyclic $C_3$-$C_{50}$ alkenyl radical, a heterocyclic $C_3$-$C_{50}$ radical, an aromatic $C_5$-$C_{50}$ radical, a polycyclic aromatic $C_{10}$-$C_{50}$ radical, a heteroaromatic $C_5$-$C_{50}$ radical, a cyclotriphosphazine radical, or a combination thereof.

Figure 3B:
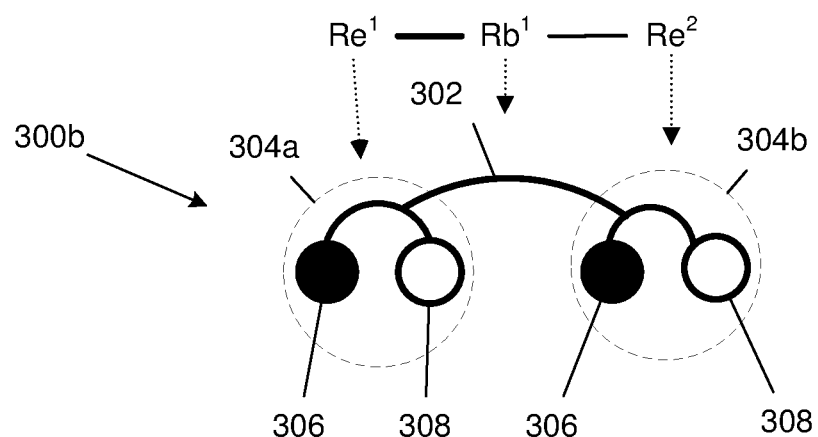
FIG. 3B is a schematic drawing showing a lubricant according to general formula (II) of the disclosure comprising a single main chain segment and a multitude of cyclic functional groups according to one aspect of the disclosure.

As shown in FIG. 3B, in one aspect indicated as 300b, each end group segment may include a cyclic functional group 308.

Figure 3C:
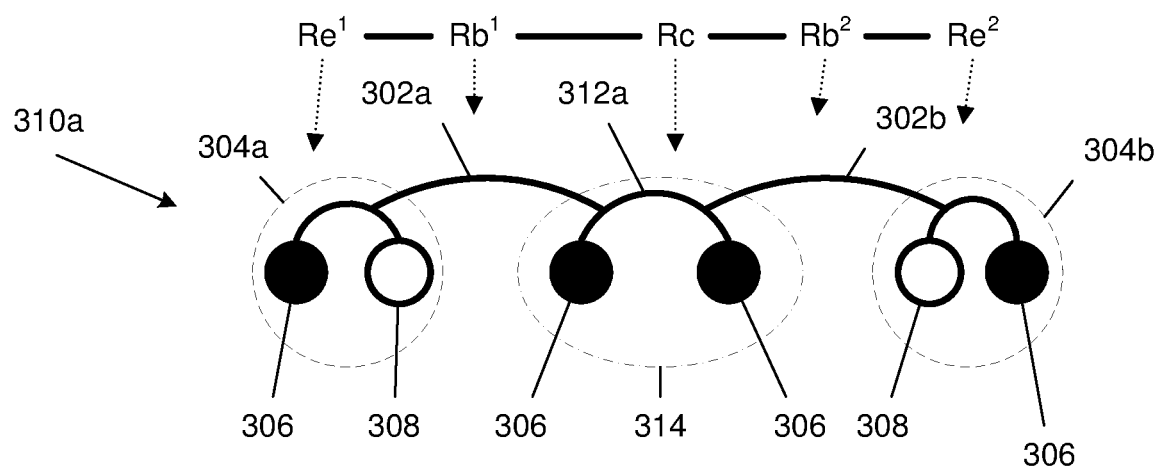
FIG. 3C is a schematic drawing showing a lubricant according to general formula (I) of the disclosure comprising two chain segments comprising terminal cyclic functional groups and separated by a linking segment according to one aspect of the disclosure.

In one aspect as shown in FIG. 3C, the boundary lubricant generally referred to as 310a may comprise or has general formula (I):

wherein the end segments $Re^1$ (304a) and $Re^2$ (304b) are as described above; in this aspect there are two chain segments $Rb^1$ (302a) and $Rb^2$ (302b), which may also be referred to herein as sidechain segments, both of which independently comprises a fluoroalkyl, fluoroalkenyl, perfluoroalkyl, or perfluoroalkyl ether moiety.

As is indicated in FIG. 3C, whether referred to as a chain segment, a main chain segment (when only one is present), or a sidechain segment (when two or more are present), each of the segments are similar to one another in that each segment comprises a fluoroalkyl, fluoroalkenyl, perfluoroalkyl, or perfluoroalkyl ether moiety.

In the aspect shown in FIG. 3C, the lubricant may further include a divalent linking segment Rc (312), generally indicated as 314, also referred to herein as a center segment, which is disposed between either end of the sidechain segments 302a and 302b, and which includes at least one anchoring functional group (306) as defined herein.

Figure 3D:
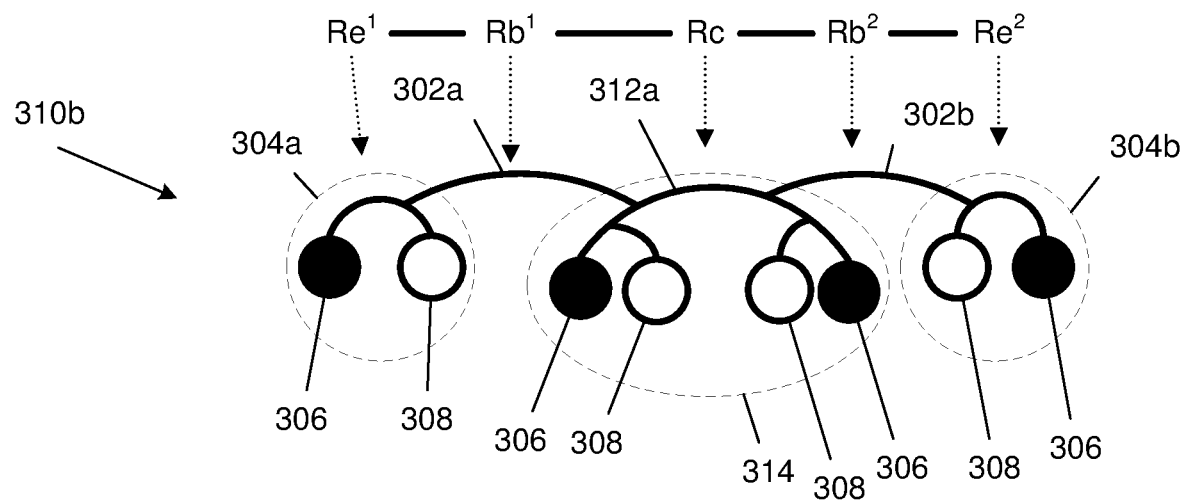
FIG. 3D is a schematic drawing showing a lubricant according to general formula (I) of the disclosure comprising two chain segments comprising terminal cyclic functional groups and separated by a linking segment comprising cyclic functional groups according to one aspect of the disclosure.

As shown in FIG. 3D, in one aspect generally indicated as 310b, the divalent linking segment Rc (312) may further include at least one cyclic functional group 308 as defined herein.

In one aspect as shown in FIG. 3E, the boundary lubricant generally referred to as 310c may comprise or has general formula (III):

wherein m=2, comprising two units of the divalent linking segments; a first unit comprising Rc (312a) also generally indicated as (314), attached to a chain segments $Rb^2$ (302b), which is attached to a second unit comprising Rc (312a') also generally indicated as (314') and a second chain segment $Rb^{2'}$ (302b'). The end segments $Re^1$ (304a) and $Re^2$ (304b) are attached to ether end of the molecule. The composition of each of the segments may be independent of one another. The composition of each of the segments is according to the description of general formula (I) herein.

In one aspect, each anchoring functional group may independently comprises a B, Si, pnictogen, chalcogen, or halogen, —OR*, —NR*$_2$, —NR*—CO—R*, —OR*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)q-SiR*$_3$, —(CF$_2$)q-SiR*$_3$, or a combination thereof, wherein q is 1 to 10 and each R* is, independently a hydrogen, a pnictogen/chalcogen/halogen, a saturated, unsaturated, aromatic, polycyclic aromatic, heteroaromatic, alicyclic, and/or heterocyclic $C_1$-$C_{50}$ radical, and two or more R* may join together to form a ring structure.

In one aspect, each cyclic functional group may further comprise, e.g., may be further substituted with a functional group comprising at least one of a B, Si, pnictogen, chalcogen, or halogen, —OR*, —NR*$_2$, —NR*—CO—R*, —OR*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)q- SiR*$_3$, —(CF$_2$)q-SiR*$_3$, or a combination thereof, wherein q is 1 to 10 and each R* is, independently a hydrogen, a pnictogen/chalcogen/halogen, a saturated, unsaturated, aromatic, polycyclic aromatic, heteroaromatic, alicyclic, and/or heterocyclic $C_1$-$C_{50}$ radical, and two or more R* may join together to form a ring structure.

In one aspect, one or more anchoring functional group may include, or is, a hydroxyl (—OH) moiety. In one aspect, each anchoring functional group includes or is a hydroxyl (—OH) moiety. In some aspects, one or more cyclic functional groups may comprise a hydroxyl (—OH) moiety. In some aspects, each cyclic functional group comprises a hydroxyl (—OH) moiety.

Cyclic Functional Groups

Applicants have discovered that the presence of the cyclic functional groups provide a multifaceted benefit for applications involving higher operational temperatures (e.g., such as HAMR media applications) when the cyclic functional groups are present in the end segments and/or the center or linking segment pendant to the chain segments according to aspects disclosed herein. It has been discovered that the cyclic functional groups reduce the contamination present on the magnetic recording media. While not wishing to be bound by theory, it is hypothesized that the cyclic functional groups act as traps for the silane and hydrocarbon contaminants, which may include free-radical traps, which sequester the contaminants and thus, reduce or prevent the contaminants from occupying portions of the recordable media.

In aspects of the disclosure, each cyclic functional group present may independently comprise an alicyclic $C_3$-$C_{50}$ alkyl radical, an alicyclic $C_3$-$C_{50}$ alkenyl radical, a heterocyclic $C_3$-$C_{50}$ radical, an aromatic $C_5$-$C_{50}$ radical, a polycyclic aromatic $C_{10}$-$C_{50}$ radical, a heteroaromatic $C_5$-$C_{50}$ radical, a cyclotriphosphazine radical, or a combination thereof.

In one aspect, a cyclic functional group may include substituted or unsubstituted analogs of borirene, cyclopropenone, furan, pyrrole, imidazole, thiophene, phosphole, pyrazole, oxazole, isoxazole, thiazole, triazole, tetrazole, pentazole, benzene, pyridine, pyrazine, pyrimidine, pyridazine, triazine, tetrazine, pentazine, hexazine, borepin, tropone, azonine, cyclooctadecanonaene, diazapentalene, thienothiophene, trithiapentalene, benzofuran, isobenzofuran, indole, isoindole, benzothiophene, benzo(c)thiophene, benzophosphole, benzimidazole, purine, indazole, benzoxazole, benzisoxazole, benzothiazole, 5-aza-7-deazapurine, naphthalene, quinoline, isoquinoline, quinoxaline, quinazoline, cinnoline, phthalazine, azulene, combinations thereof, and/or the like.

In one aspect, each cyclic functional group may independently include a substituted or unsubstituted monovalent moiety comprising a formula selected from the group consisting of:

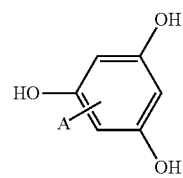

(Ia)

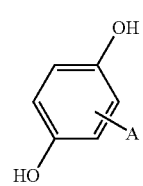

(IIa)

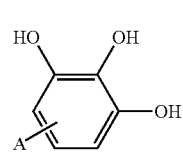

(IIIa)

(IVa)

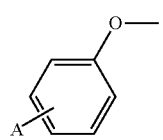

(Va)

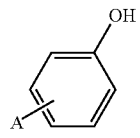

(VIa)

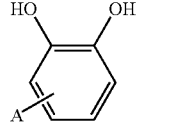

(VIIa)

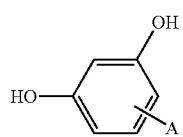

(VIIIa)

(IXa)

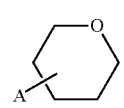

(Xa)

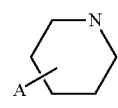

(XIa)

(XIIa)

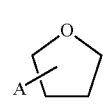

(XIIIa)

(XIVa)

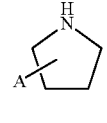

(XVa)

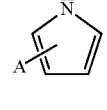

(XVIa)

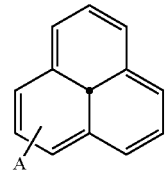

(XVIIa)

-continued

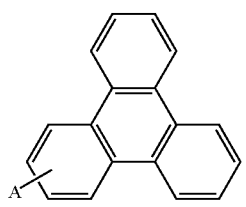 (VIIIa)

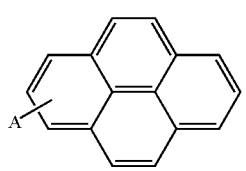 (XIXa)

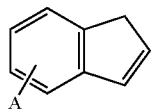 (XXa)

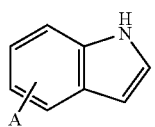 (XXIa)

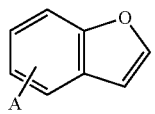 (XXIIa)

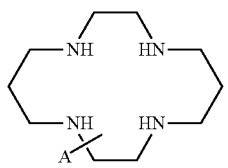 (XXIIIa)

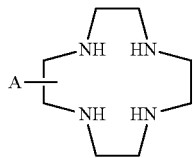 (XXIVa)

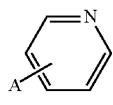 (XXVa)

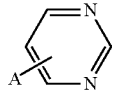 (XXVIa)

 (XXVIIa)

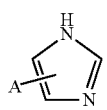 (XXVIIIa)

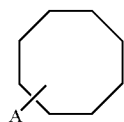 (XXIXa)

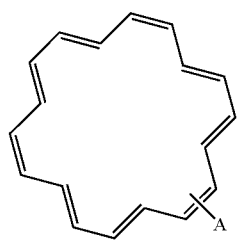 (XXXa)

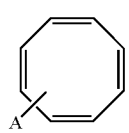 (XXXIa)

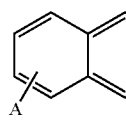 (XXXIIa)

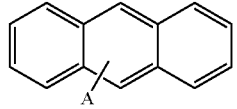 (XXXIIIa)

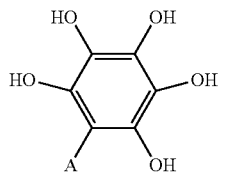 (XXXIVa)

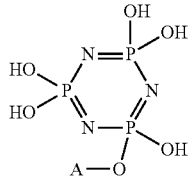 (XXXVa)

 (XXXVIa)

or a combination thereof, wherein the moiety is bonded to the respective segment "A" at any substitutable position. In one aspect, each formula may be further substituted with one or more functional groups comprising one or more of a B, Si, pnictogen, chalcogen, or halogen, —OR*, —NR*$_2$, —NR*—CO—R*, —OR*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)q-SiR*$_3$, —(CF$_2$)q- SiR*$_3$, or a combination thereof, wherein q is 1 to 10 and each R* is, independently a hydrogen, a pnictogen/chalcogen/halogen, a saturated, unsaturated, aromatic, polycyclic aromatic, heteroaromatic, alicyclic, and/or heterocyclic $C_1$-$C_{50}$ radical, and two or more R* may join together to form a ring structure.

In one aspect, each cyclic functional group may comprise an oxygen atom. In one aspect, each cyclic functional group comprises at least one of a monovalent anisolyl radical according to formula II, a phenolic radical according to formula III, a resorcinolyl radical according to formula V, a catecholyl radical according to formula IV, a hydroquinonyl radical according to formula VII, a phloroglucinolyl radical according to formula VI, a pyrogallolyl radical according to formula VIII, a phenalenyl radical according to formula XVII, an indolyl radical according to formula XXI, an adamantanyl radical according to formula XXXVI, or a combination thereof, which in an aspect may be further substituted with one or more functional groups comprising one or more of a B, Si, pnictogen, chalcogen, or halogen, —OR*, —NR*$_2$, —NR*—CO—R*, —OR*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)q-SiR*$_3$, —(CF$_2$)q-SiR*$_3$, or a combination thereof, wherein q is 1 to 10 and each R* is, independently a hydrogen, a pnictogen/chalcogen/halogen, a saturated, unsaturated, aromatic, polycyclic aromatic, heteroaromatic, alicyclic, and/or heterocyclic $C_1$-$C_{50}$ radical, and two or more R* may join together to form a ring structure.

Divalent Linking Segment (Rc)

In one aspect, a lubricant may comprise or have general formulas general formulas (I) or (III):

$$Re^1—Rb^1—Rc—Rb^2—Re^2 \quad (I);$$

$$Re^1—Rb^1\text{-}(Rc\text{-}Rb^2)_m—Re^2 \quad (III);$$

wherein m is from 1 to 20; the divalent linking or center segment Rc further includes one or more anchoring functional groups, and/or one or more cyclic functional groups.

In one aspect, Rc includes or has general formula (IV):

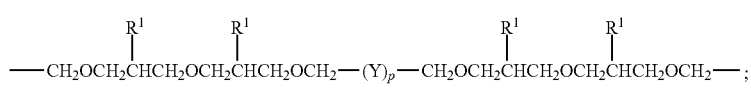

wherein each Y independently comprises:
(i) —CH$_2$—;
(ii) —CF$_2$—;
(iii) —CHF—;
(iv) —CF$_2$CF$_2$CF$_2$O(CF$_2$CF$_2$CF$_2$CF$_2$O)$_a$CF$_2$CF$_2$CF$_2$—;
(v) —CF$_2$CF$_2$O(CF$_2$CF$_2$CF$_2$O)$_a$CF$_2$CF$_2$—;
(vi) —CF$_2$CF$_2$O[CF(CF$_3$)CF$_2$O]$_a$CF$_2$CF$_2$—;
(vii) —CF$_2$O(CF$_2$CF$_2$O)$_a$(CF$_2$O)$_b$CF$_2$—;
(viii) —CF$_2$O(CF$_2$CF$_2$O)$_a$CF$_2$—;
or a combination thereof;
wherein each a is, independently from 1 to 20,
wherein each b, when present, is independently from 1 to 20;
wherein p is from 1 to 20; and
wherein at least one R$^1$ is an anchoring functional group engageable with a protective overcoat of a magnetic recording media, comprising B, Si, a pnictogen, a chalcogen, a halogen, —OR*, —NR*$_2$, —NR*—CO—R*, —OR*, —O—CO—R*, —CO—O—R*, —SeR, —TeR, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*, —SiR*$_3$, —(CH$_2$)$_q$-SiR*$_3$, —(CF$_2$)$_q$-SiR*$_3$, or a combination thereof, wherein q is 1 to 10 and each R* is, independently, a hydrogen, B, Si, a pnictogen, a chalcogen, a halogen, a saturated $C_1$-$C_{50}$ radical, an unsaturated $C_2$-$C_{50}$ radical, an aromatic $C_4$-$C_{50}$ radical, a polycyclic aromatic $C_5$-$C_{50}$ radical, a heteroaromatic $C_5$-$C_{50}$ radical, an alicyclic $C_3$-$C_{50}$ radical, a heterocyclic $C_2$-$C_{50}$ radical, and wherein two or more R* may join together to form a ring structure.

In a related aspect, at least one R$^1$ present on the linking segment Rc may be a cyclic functional group including an alicyclic $C_3$-$C_{50}$ alkyl radical, an alicyclic $C_3$-$C_{50}$ alkenyl radical, a heterocyclic $C_3$-$C_{50}$ radical, an aromatic $C_5$-$C_{50}$ radical, a polycyclic aromatic $C_{10}$-$C_{50}$ radical, a heteroaromatic $C_5$-$C_{50}$ radical, a cyclotriphosphazine radical, or a combination thereof. In one aspect, at least one R$^1$ present on the linking segment Rc may be a hydroxyl moiety (—OH). In another aspect, each R$^1$ present on the linking segment Rc may comprise a hydroxyl moiety, e.g., is a hydroxyl moiety or is substituted with a hydroxyl moiety. In another aspect, each R$^1$ present on the linking segment Rc is a hydroxyl moiety.

In an aspect, Rc includes or is of general formula (V):

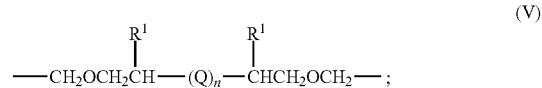

wherein each Q independently comprises:
(i) —CH$_2$—;
(ii) —CF$_2$—;
(iii) —CHF—;
(iv) —CF$_2$CF$_2$CF$_2$O(CF$_2$CF$_2$CF$_2$CF$_2$O)$_a$CF$_2$CF$_2$CF$_2$—;
(v) —CF$_2$CF$_2$O(CF$_2$CF$_2$CF$_2$O)$_a$CF$_2$CF$_2$—;
(vi) —CF$_2$CF$_2$O[CF(CF$_3$)CF$_2$O]$_a$CF$_2$CF$_2$—;
(vii) —CF$_2$O(CF$_2$CF$_2$O)$_a$(CF$_2$O)$_b$CF$_2$—;
(viii) —CF$_2$O(CF$_2$CF$_2$O)$_a$CF$_2$—;
or a combination thereof;
wherein each a is, independently from 1 to 20, or from 1 to 10, or from 1 to 5;
wherein each b, when present, is independently from 1 to 20 or from 1 to 10, or from 1 to 5; wherein n is from 1 to 20 or from 1 to 10, or from 1 to 5; and
wherein at least one R$^1$ is an anchoring functional group engageable with a protective overcoat of a magnetic recording media, comprising B, Si, a pnictogen, a chalcogen, a halogen, —OR*, —NR*$_2$, —NR*—CO—R*, —OR*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$-SiR*$_3$, —(CF$_2$)$_q$-SiR*$_3$, or a combination thereof, wherein q is 1 to 10 and each R* is, independently, a hydrogen, B, Si, a pnictogen, a chalcogen, a halogen, a saturated $C_1$-$C_{50}$ radical, an unsaturated $C_2$-$C_{50}$ radical, an aromatic $C_4$-$C_{50}$ radical, a polycyclic aromatic $C_5$-$C_{50}$ radical, a heteroaromatic $C_5$-$C_{50}$ radical, an alicyclic $C_3$-$C_{50}$ radical, a heterocyclic $C_2$-$C_{50}$ radical, wherein two or more R* may join together to form a ring structure.

In a related aspect, at least one $R^1$ present on the linking segment Rc may be a cyclic functional group including an alicyclic $C_3$-$C_{50}$ alkyl radical, an alicyclic $C_3$-$C_{50}$ alkenyl radical, a heterocyclic $C_3$-$C_{50}$ radical, an aromatic $C_5$-$C_{50}$ radical, a polycyclic aromatic $C_{10}$-$C_{50}$ radical, a heteroaromatic $C_5$-$C_{50}$ radical, a cyclotriphosphazine radical, or a combination thereof. In one aspect, at least one $R^1$ present on the linking segment Rc may be a hydroxyl moiety (—OH). In another aspect, each $R^1$ present on the linking segment Rc comprises a hydroxyl moiety, e.g., is a hydroxyl moiety or is substituted with a hydroxyl moiety. In another aspect, each $R^1$ present on the linking segment Rc is a hydroxyl moiety.

In one aspect Rc comprises an ester functional group according to general formula (VI), (VII), or a combination thereof:

 (VI)

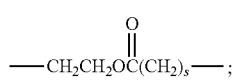 (VII)

wherein t, when present, is from 1 to 20, or from 1 to 10, or from 1 to 5; and wherein s, when present, is from 1 to 20, or from 1 to 10, or from 1 to 5.

Main Chain—Side Chain Segment (Rb)

In one aspect, wherein a lubricant comprises general formula (II):

 (II);

and/or in an aspect wherein a lubricant comprises general formulas (I) or (III):

 (I); or

 (III);

wherein m is from 1 to 20; the main chain segment $Rb^1$ and/or the side chain segments $Rb^1$ and $Rb^2$ include a fluoroalkyl, fluoroalkenyl, perfluoroalkyl, or perfluoroalkyl ether moiety. In one aspect, each chain segment present in the lubricant may comprise or has the formula:
  (iv) —$CF_2CF_2CF_2O(CF_2CF_2CF_2CF_2O)_aCF_2CF_2CF_2$—;
  (v) —$CF_2CF_2O(CF_2CF_2CF_2O)_aCF_2CF_2$—;
  (vi) —$CF_2CF_2O[CF(CF_3)CF_2O]_aCF_2CF_2$—;
  (vii) —$CF_2O(CF_2CF_2O)_a(CF_2O)_bCF_2$—;
  (viii) —$CF_2O(CF_2CF_2O)_aCF_2$—;

or a combination thereof, wherein each a is, independently from 1 to 100, or from 1 to 20, or from 1 to 10, or from 1 to 5, and wherein each b, when present, is independently from 1 to 100, or from 1 to 20, or from 1 to 10, or from 1 to 5.

End Segment (Re)

In one aspect of the disclosure, each end segment $Re^1$ and $Re^2$ may independently include or may have general formula (VIII):

 (VIII)

wherein at least one $R^1$ is an anchoring functional group attachable to and/or engageable with a protective overcoat of a magnetic recording media, comprising: a B, Si, pnictogen, chalcogen, or halogen, —OR*, —NR*$_2$, —NR*—CO—R*, —OR*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$-SiR*$_3$, —(CF$_2$)$_q$-SiR*$_3$, or a combination thereof, wherein q is 1 to 10 and each R* is, independently a hydrogen, a pnictogen/chalcogen/halogen, a saturated, unsaturated, aromatic, polycyclic aromatic, heteroaromatic, alicyclic, and/or heterocyclic $C_1$-$C_{50}$ radical, and two or more R* may join together to form a ring structure. In one aspect, each end segment $Re^1$ and $Re^2$ may independently include at least one $R^1$ which may be a cyclic functional group which may include an alicyclic $C_3$-$C_{50}$ alkyl radical, an alicyclic $C_3$-$C_{50}$ alkenyl radical, a heterocyclic $C_3$-$C_{50}$ radical, an aromatic $C_5$-$C_{50}$ radical, a polycyclic aromatic $C_{10}$-$C_{50}$ radical, a heteroaromatic $C_5$-$C_{50}$ radical, a cyclotriphosphazine radical, or a combination thereof, which may be further substituted with a functional group as disclosed herein.

In one aspect, one or more anchoring functional group may include, or is a hydroxyl (—OH) moiety. In one aspect, each anchoring functional group may include or is a hydroxyl (—OH) moiety. In some aspects, one or more cyclic functional groups comprises a hydroxyl (—OH) moiety. In some aspects, each cyclic functional group comprises a hydroxyl (—OH) moiety.

Exemplary Lubricant Structures

In one aspect, the lubricant includes or has a structure according to general formula (IX):

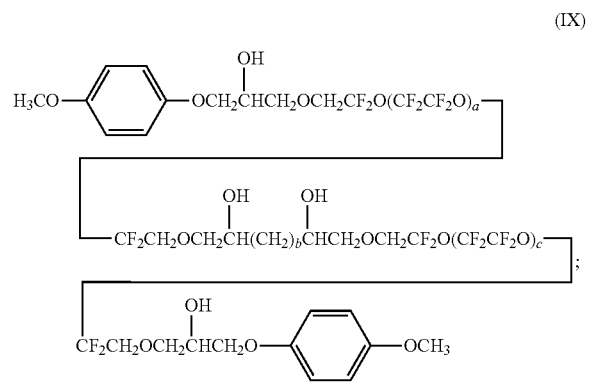

wherein a is from 1 to 100, or from 1 to 20, or from 1 to 10, or from 1 to 5; b is from 1 to 20, or from 1 to 10, or from 1 to 5; and c is from 1 to 100, or from 1 to 20, or from 1 to 10, or from 1 to 5.

In one aspect of the disclosure, the lubricant includes or has a structure according to general formula (X):

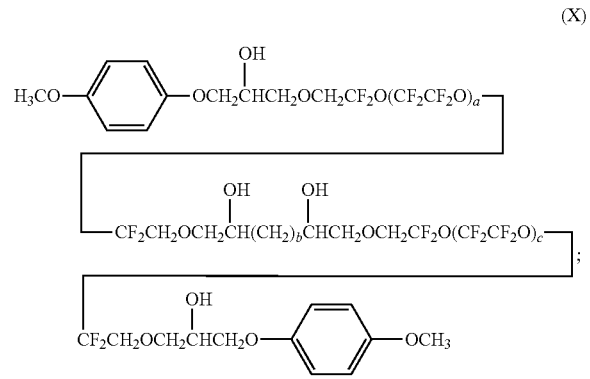

wherein a is from 1 to 100, or from 1 to 20, or from 1 to 10, or from 1 to 5; b is from 1 to 20, or from 1 to 10, or from 1 to 5; and c is from 1 to 100, or from 1 to 20, or from 1 to 10, or from 1 to 5.

In one or more aspects, the lubricant is bidentate, tridentate, tetradentate, pentadentate, hexadentate, septedentate, octadentate, or higher. In one or more aspects, the lubricants are stable above about 250° C., or above about 300° C., or above about 325° C., or above about 350° C., or above about 375° C., and less than or equal to about 450° C., or 425° C. when determined in air, nitrogen, helium, or 90 vol % helium 10 vol % oxygen.

In one or more aspects, the lubricant has a weight average molecular weight of greater than or equal to about 0.5 kiloDalton (kDa), or from about 1 to about 20 kDa, or from about 2 to about 10 kDa, or from about 3 to about 7 kDa, or from about 1 to about 5 kDa, or 2 to about 4 kDa.

In one or more aspects, the lubricant has a weight average molecular weight of greater than or equal to about 500 grams per mole (g/mol), or from about 1,000 to about 20,000 g/mol, or from about 2,000 to about 10,000 g/mol, or from about 3,000 to about 7,000 g/mol, or from about 1,000 to about 5,000 g/mol, or 2,000 to about 4,000 g/mol.

In one or more aspects, the lubricants are essentially pure compounds, having a polydispersity, defined as the number average molecular weight Mn divided by the weight average molecular weight Mw (Mn/Mw) from about 1 to 2, or from about 1 to about 1.5, or from about 1 to about 1.1, or from about 1 to about 1.05.

Returning to FIG. 2, in one or more aspects, the magnetic recording medium 200 has a stacked structure which includes a lubricant layer 216 on the overcoat layer 214. The lubricant present in the layer may comprise a plurality of segments according to general formulas (I), (II), or (III):

$Re^1—Rb^1—Rc—Rb^2—Re^2$ (I);

$Re^1—Rb^1—Re^2$ (II); or $Re^1—Rb^1-(Rc-Rb^2)_m—Re^2$ (III);

wherein m, when present, is from 1 to 20, Rc, when present, is a divalent linking segment including an anchoring functional group attachable and/or engageable with a protective overcoat of a magnetic recording media; $Rb^1$, and $Rb^2$ when present, independently includes a chain segment including a fluoroalkyl, fluoroalkenyl, perfluoroalkyl, or perfluoroalkyl ether moiety; each of $Re^1$ and $Re^2$ independently includes, an anchoring functional group attachable to and/or engageable with a protective overcoat of a magnetic recording media, and one or more of $Re^1$, $Re^2$, and Rc when present, includes a cyclic functional group comprising at least one of an alicyclic $C_3$-$C_{50}$ alkyl radical, an alicyclic $C_3$-$C_{50}$ alkenyl radical, a heterocyclic $C_3$-$C_{50}$ radical, an aromatic $C_5$-$C_{50}$ radical, a polycyclic aromatic $C_{10}$-$C_{50}$ radical, a heteroaromatic $C_5$-$C_{50}$ radical, a cyclotriphosphazine radical, or a combination thereof, according to one or more aspects of the disclosure.

In one or more aspects, the average thickness of the lubricant layer of the magnetic recording medium is less than about 10 nanometers (nm), or less than about 5 nm, or less than or equal to about 1 nm. In some aspects, the lubricant of the magnetic recording medium has an average thickness from about 0.1 nm to about 10 nm, or from about 0.1 nm to about 1 nm.

In one or more aspects of the magnetic recording medium, the lubricant may have a bonding percentage of at least about 30%, or at least about 50%, or at least about 70%, or at least about 80%, or at least about 90%, and less than or equal to about 99%, or less than or equal to about 95%, corresponding to a post-stripping bonding level of the lubricant to the total area of an upper surface of the protective overcoat.

In one aspect, a magnetic data storage system may include a magnetic head; a magnetic recording medium according to any one or a combination of aspects disclosed herein including a lubricant according to one or more aspects disclosed herein, a drive mechanism for moving the magnetic head over the magnetic recording medium; and a controller electrically coupled to the magnetic head for controlling operation of the magnetic head.

Media Fabrication

Figure 4:
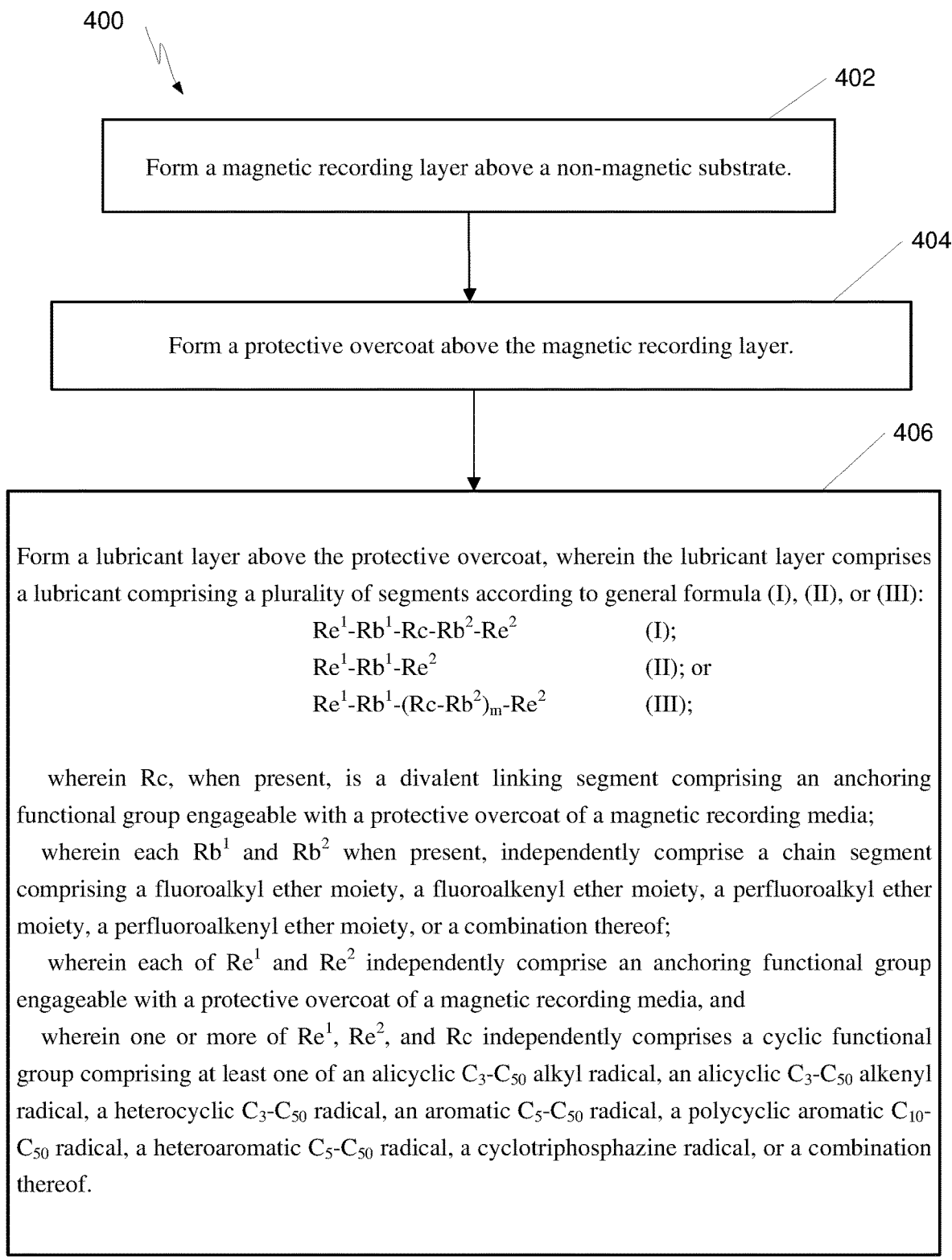
FIG. 4 is a flowchart of a method for forming a magnetic recording medium comprising a lubricant layer thereon, according to one aspect of the disclosure.
Figure 5A:
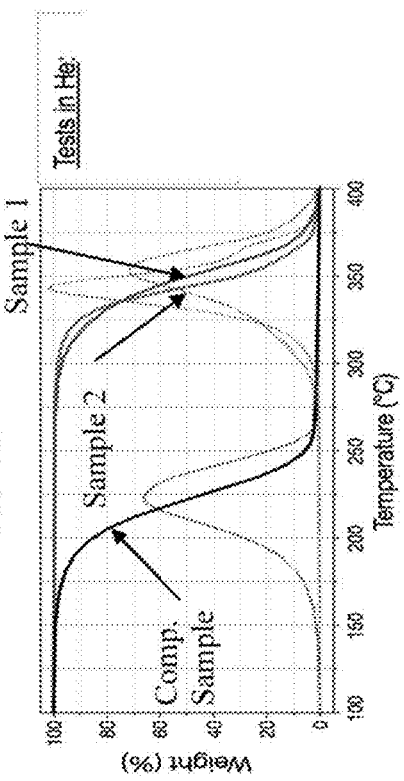
FIG. 5A is graph showing thermogravimetric analysis of lubricants in nitrogen according to aspects of the disclosure.
Figure 5B:
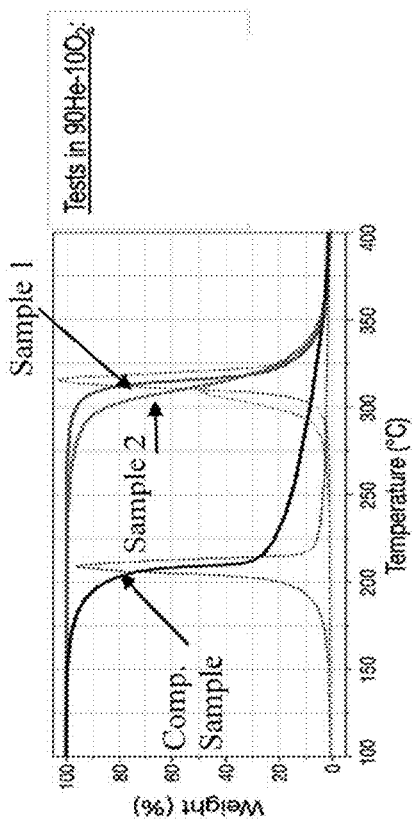
FIG. 5B is graph showing thermogravimetric analysis of lubricants in helium according to aspects of the disclosure.
Figure 5C:
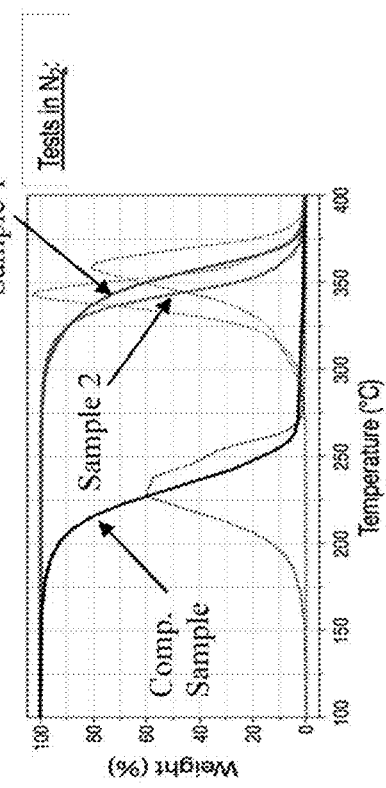
FIG. 5C is graph showing thermogravimetric analysis of lubricants in air according to aspects of the disclosure.
Figure 5D:
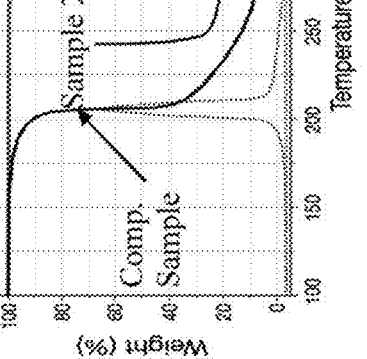
FIG. 5D is graph showing thermogravimetric analysis of lubricants in a mixture of 90% helium and 10% oxygen according to aspects of the disclosure.

Referring to FIG. 4, a method 400 for forming a magnetic recording medium having a boundary lubricant is shown according to one aspect of the disclosure. As shown in FIG. 4, the method 400 includes forming a magnetic recording layer above a non-magnetic substrate. See operation 402. In various approaches, the method 400 may also include forming other layers positioned between the non-magnetic substrate and the magnetic recording layer. These other layers may include, for example, one or more underlayers, soft underlayers, adhesion layers, etc. (e.g., any of the layers shown in FIG. 2).

As also shown in FIG. 4, the method 400 further includes forming a protective overcoat above the magnetic recording layer and/or forming a capping layer on the magnetic layer and forming a protective overcoat layer on the capping layer. See operation 404. The method 400 further includes forming a lubricant layer on the protective overcoat layer. See operation 406. This lubricant layer may include a lubricant according to one or more aspects disclosed herein.

It is important to note that in alternative approaches, the lubricant layer formed above the protective overcoat may include any of the multidentate fluoroalkyl, fluoroalkenyl, perfluoroalkyl, or perfluoropolyether boundary lubricants described herein, singly and/or in any combination.

In various aspects, the lubricant layer can be formed on the magnetic recording medium, specifically on the protective overcoat, via a dip coating method. For instance, in one aspect the magnetic recording medium may be dipped into a lubricant bath including the multidentate perfluoropolyether boundary lubricant according to one or more aspects of the disclosure and a fluorocarbon solvent such as HFE7100 or Vertrel-XF. After a predetermined amount of time, the magnetic recording medium may be pulled out from the lubricant bath at a controlled rate. The solvent may then evaporate, leaving behind a lubricant layer comprising the multidentate perfluoropolyether boundary lubricant. The bonding percentage is quantified by stripping the lubricated magnetic recording medium with the solvents used in the lubricant bath at various post-lube time periods.

The thickness of the lubricant layer may be tuned by controlling the submergence duration of the magnetic recording medium in the lubricant bath, the rate at which the magnetic recording medium is removed from the coating solution, and/or the concentration of the boundary lubricant (e.g. the lubricant according to one or more aspects of the disclosure) in the lubricant bath.

In one or more aspects, the concentration of lubricant in the lubricant bath may be in a range from about 0.001 g/L to about 1 g/L. In yet other aspects, the concentration of the lubricant in the lubricant bath may be selected so as to achieve a resulting lubricant layer with a thickness in a range from about less than or equal to about 10 nanometers (nm), or less than or equal to about 5 nm, or less than or equal to about 1 nm or from 0.1 nm to less than about 1 nm.

Likewise, the formation of the lubricant layer on the surface of the magnetic recording medium, specifically on the surface of the protective overcoat, is not limited to dip coating, but may also involve spin coating, spray coating, a vapor deposition, combinations thereof, or any other suitable coating process as would be understood by one having skill in the art upon reading the present disclosure.

It should be noted that methodology presented herein for at least some of the various aspects may be implemented, in whole or in part, in computer hardware, by hand, using specialty equipment, etc. and combinations thereof.

Moreover, any of the structures and/or steps may be implemented using known materials and/or techniques, as would become apparent to one skilled in the art upon reading the present disclosure.

In some aspects, the processes herein can perform the sequence of actions as shown in FIG. 4 in a different order. In other aspects, the processes can skip one or more of the actions. In still other aspects, one or more of the actions are performed simultaneously. In some aspects, additional actions can be performed. For example, in one aspect, the process may include any additional actions needed to fabricate the magnetic recording layer structure.

In some aspects, the forming or deposition of such layers can be performed using a variety of deposition sub-processes, including, but not limited to physical vapor deposition (PVD), direct current (DC) sputter deposition, ion beam deposition, radio frequency sputter deposition, or chemical vapor deposition (CVD), including plasma enhanced chemical vapor deposition (PECVD), low pressure chemical vapor deposition (LPCVD) and atomic layer chemical vapor deposition (ALCVD). In other embodiments, other suitable deposition techniques known in the art may also be used.

The terms "on," "above," "below," and "between" as used herein refer to a relative position of one layer with respect to other layers. As such, one layer deposited or disposed on/above or below another layer may be directly in contact with the other layer or may have one or more intervening layers. Moreover, one layer deposited or disposed between layers may be directly in contact with the layers or may have one or more intervening layers.

EXAMPLES

The following exemplary lubricants were prepared and evaluated according to standard methods in the art.

Sample 1 was prepared according to general formula (IX):

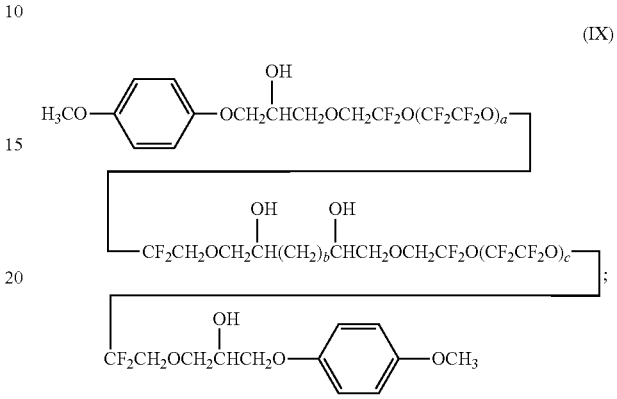

(IX)

wherein a=4-8, b=2-6, c=4-8. Sample 1 had an average molecular weight of about 3,000 g/mol and a polydispersity (Mw/Mn) from about 1.01 to 1.25.

Sample 2 was prepared according to general formula (X):

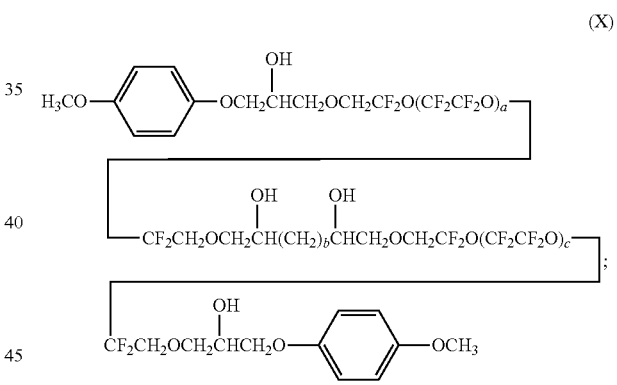

(X)

wherein a=5-9, b=2-6, c=5-9. Sample 2 had an average molecular weight of about 2,700 g/mol and a polydispersity (Mw/Mn) from about 1.01 to 1.25.

The Comparative Example was prepared according to the following formula:

wherein a=6-10. The Comparative Example had an average molecular weight of about 1,700 g/mol with a polydispersity (Mw/Mn) from about 1.01 to 1.3.

Thermogravimetric Analysis—Thermal Stability

The samples were evaluated for thermal stability by thermogravimetric analysis in the indicated atmosphere according to standard methods in the art. FIG. 5A through 5D present these data, wherein the dotted lines represent the first derivative of the corresponding data.

These data show a shift of weight loss curves (solid lines) to the high temperature end. The corresponding weight loss derivative peaks (dot lines) at high temperatures are shown for the exemplary lubricants. These data confirm the lubricants according to various aspects of the disclosure, have remarkably improved thermal stability relative to the comparative example, which is a comparative lubricant used by the inventors in other similar applications. These improvements include significantly higher critical decomposition temperatures relative to the comparative example lubricant. The combination of multiple perfluoropolyether chain segments with the cyclic functional groups-terminated molecular design enhances the thermal stability while making suitable low-profile/short backbone lubricants possible.

Organic Si Contamination Robustness

The contamination robustness of these lubricants was evaluated via a lube barrier test in which, in an enclosed desiccator, lubed disks are exposed to a piece of organic contaminant gel at an elevated temperature (e.g., 50° C.-100° C.) for a suitable duration (e.g., 1~48 hours). The outgassing of contaminants are then captured by the disk surface in areas that are not covered/protected by the lubricant molecules. After the exposure test is completed, characteristic siloxane fragments on the disks are analyzed by time of flight—secondary ion mass spectroscopy or gas chromatography-mass spectroscopy (TOF-SIMS or GC-MS), and the results are presented as "Si Counts."

Figure 6A:
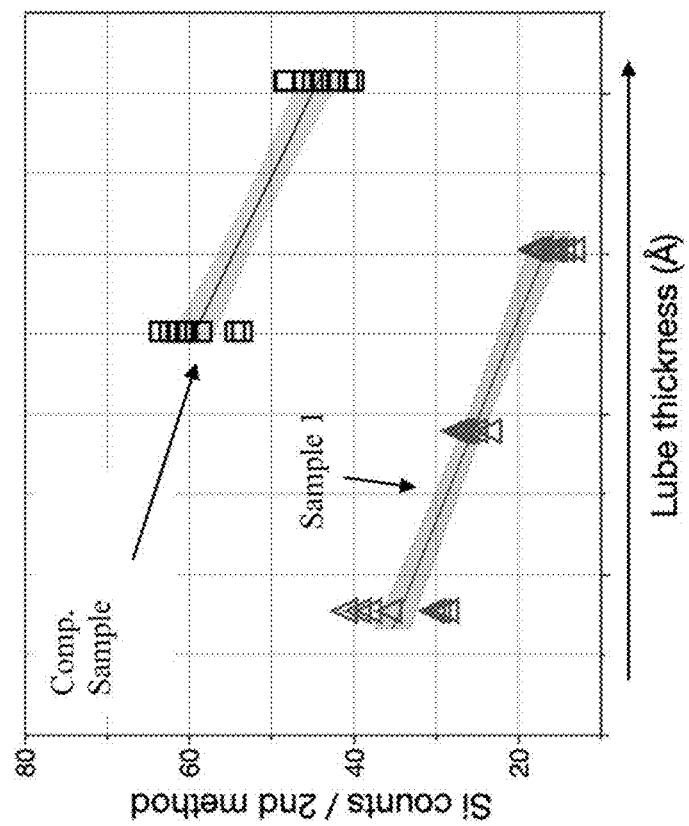
FIG. 6A is a graph showing contamination robustness in the form of time of flight mass spectrometry (TOF-MS) Si counts versus the thickness of a lubricant utilizing a representative group of Si ions according to aspects of the disclosure.
Figure 6B:
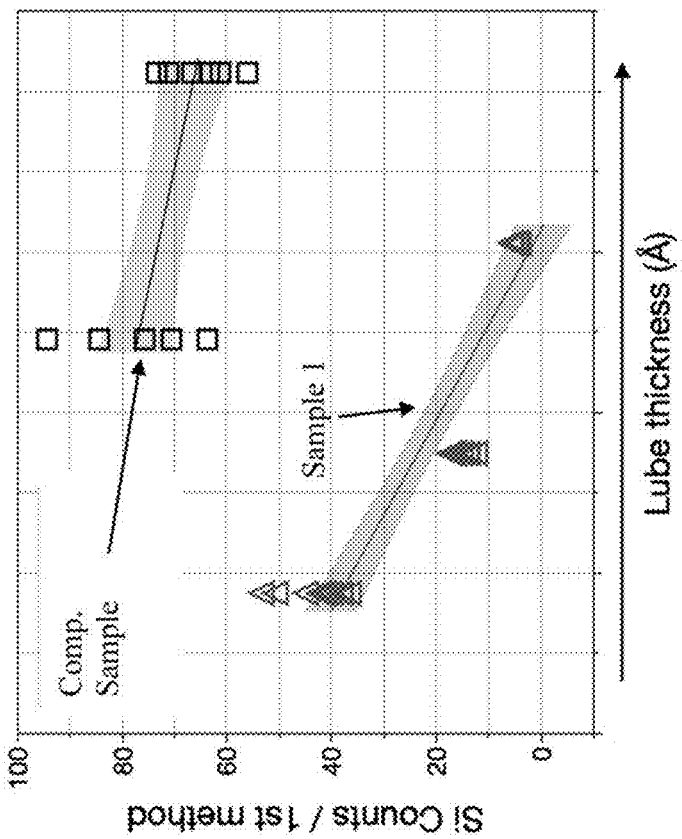
FIG. 6B is a graph showing contamination robustness in the form of TOF-MS Si counts versus the thickness of a lubricant utilizing another representative group of Si ions according to aspects of the disclosure.

FIGS. 6A and 6B present these results or "Si Counts." In particular, these data reflect characteristic organic Si fragments on the disks analyzed by TOF-SIMS after siloxane exposure. The results are presented as "Si Counts" wherein the lower Si counts indicates a more robust performance of the disk to resist organic Si contaminations. As these data show, disks processed with a thinner layer of the exemplary lubricant (Sample1) show much lower Si counts (i.e., higher Si robustness) than those processed with a thicker layer of the comparative lubricant.

Head Wear and Flyability

Figure 7B:
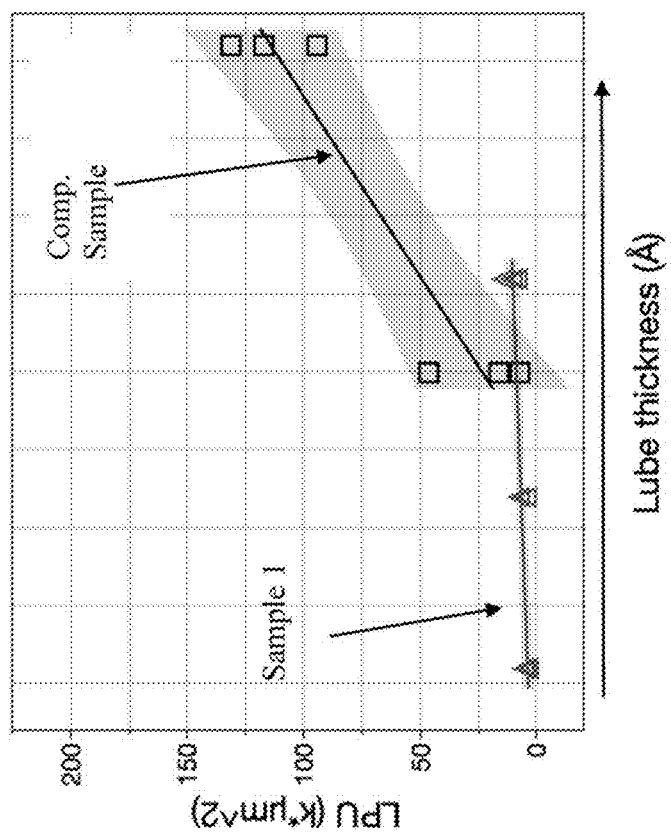
FIG. 7B is a graph showing the results of a lube pickup evaluation of selected lubricants according to one aspect of the disclosure.
Figure 7A:
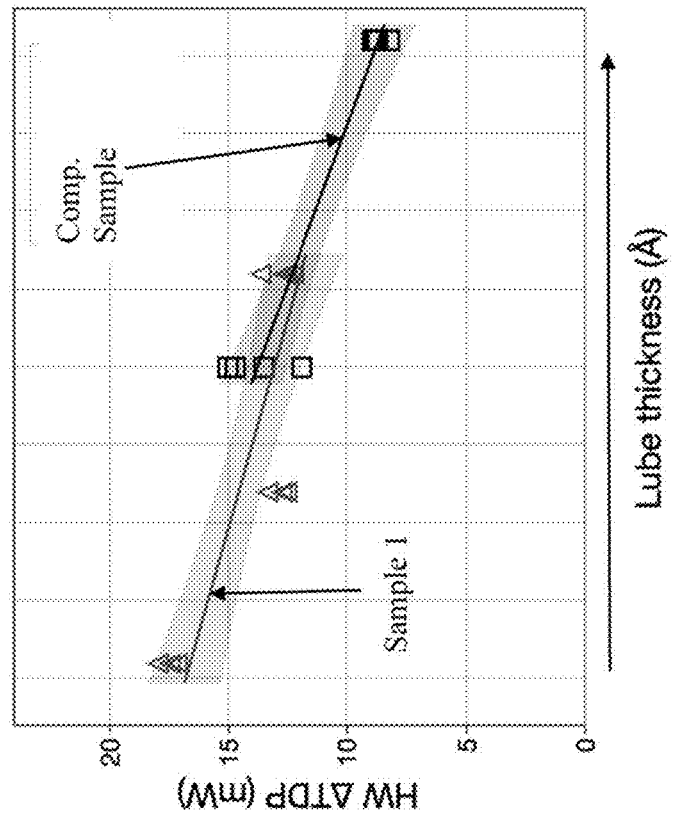
FIG. 7A is a graph showing the results of a spin-stand head wear evaluation of selected lubricants according to one aspect of the disclosure.

FIG. 7A is a graph showing the results of a spin-stand head wear evaluation of a lubricant according to one aspect of the disclosure. The head wear performance of the lubricants was tested utilizing spin-stand techniques wherein the heads/sliders are tested by on-track sliding under over-push conditions in a helium ambient environment. Touchdown power is first measured on a reference track and used to define the 0 power [e.g., 0 milliWatt (mW)] touch-down (TD) plane, which is then defined by the thermal fly-height control (TFC) power that is required to cause the contact of the read/write pole tip with the reference track. The head/slider is then moved to a nearby track for a 20 mW over-push test, during which certain additional thermal protrusion by TFC is applied to the pole tip to ensure a stressful slider-disk contact throughout the continuous on-track sliding process. TD power is measured again after the on-track sliding test and the slider is moved back to the reference track. Head wear results are analyzed by evaluating the change in various TD parameters before and after the sliding tests of multiple heads and disks according to statistical methods common in the art.

Spin-stand head wear evaluation measures touchdown power changes of the heads before and after an on-track over-push sliding test. The greater the delta in the touch-down power ($\Delta$TDP) is the higher the head wear incurred. A thinner design of the new lubricant (Sample1) confirms a slightly higher yet reasonable head wear performance profile under these stressful tests (See FIG. 7A).

FIG. 7B is a graph showing the results of a lube pickup evaluation of a lubricant according to one aspect of the disclosure. Spin-stand tests conducted for lube pick-up "(LPU) tests" were conducted in which after sweeping multiple sliders on several disk surfaces at elevated temperatures in helium, the flyability performance is quantified by inspecting the LPU amounts on the air-bearing surface (ABS) utilizing an oil dipping and/or time of flight secondary ion mass spectrometry (TOF-SIMS) analysis method known in the art. The less LPU the better flyability. The new lubricant (Sample1) shows an improved flyability performance over the control lubricant (See FIG. 7B), which was later confirmed using TOF-SIMS analysis.

Recording Performance

The effects of the exemplary lubricants on the recording performance were evaluated according to standard drive tests using the corresponding data collected relative to the comparative lubricant. Change percentage of areal density capability (ADC) and delta touchdown power ($\Delta$TDP) are evaluated. These data are shown in FIGS. 8A and 8B.

Figure 8B:
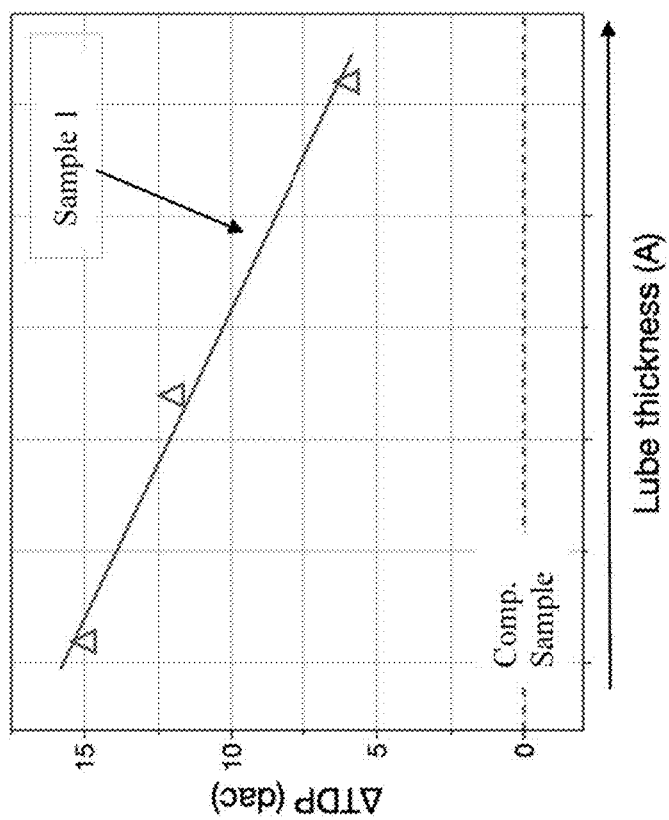
FIG. 8B is a graph showing the results of a delta touchdown power evaluation utilizing different lubricants according to one aspect of the disclosure.
Figure 8A:
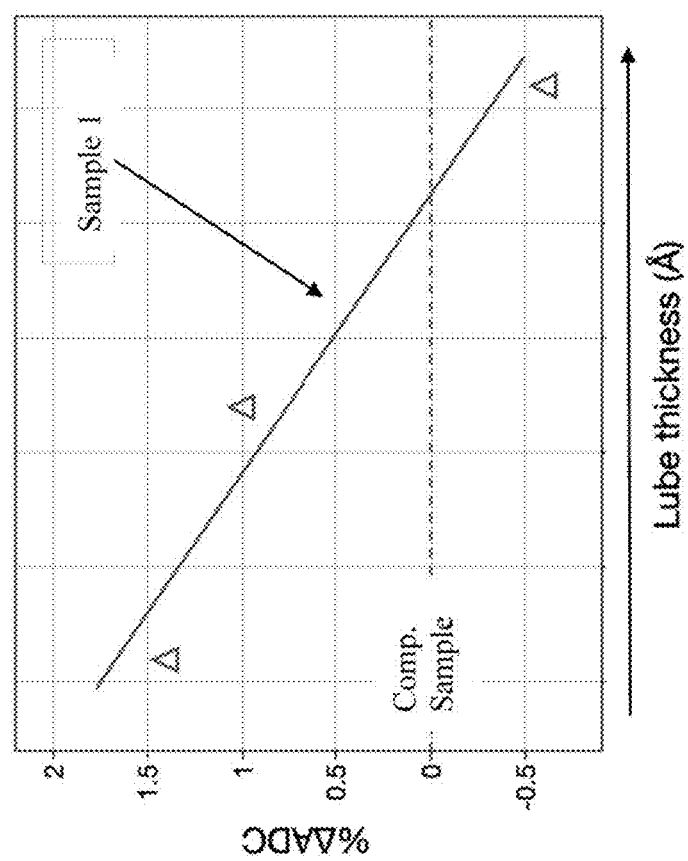
FIG. 8A is a graph showing the results of a change percentage of areal density capability (ADC) evaluation utilizing different lubricants according to one aspect of the disclosure.

FIG. 8A is a graph showing the results of a change percentage of areal density capability (ADC) evaluation utilizing different lubricants according to one aspect of the disclosure.

FIG. 8B is a graph showing the results of a delta touchdown power evaluation utilizing different lubricants according to one aspect of the disclosure.

As the data in FIGS. 8A and 8B show, ADC gains can be obtained with the increased $\Delta$TDP for the exemplary lubricant, indicating a head-media spacing gain enabled by the exemplary lubricant.

Processability

The processability of the inventive lubricant was preliminary determined relative to the comparative example. These data are shown in FIG. 9A through 9G.

FIG. 9A is a graph showing the processability of a lubricant according to one aspect of the disclosure indicated by lube thickness versus lube concentration.

FIG. 9B is a graph showing the processability of a lubricant according to one aspect of the disclosure indicated by circumferential lube thickness ranges versus lube thickness for the selected high-temperature lubricant sample 1.

FIG. 9C is a graph showing the processability of a lubricant according to one aspect of the disclosure indicated by lube thickness standard deviation of the selected high-temperature lubricant sample 1 versus its lube thickness.

FIG. 9D is a statistical summary of the data shown in FIG. 9C.

FIG. 9E is a graph showing the circumferential lube thickness ranges versus lube thickness for the comparative sample.

FIG. 9F is a graph showing lube thickness standard deviation of the comparative sample versus its lube thickness.

FIG. 9G is a statistical summary of the data shown in FIG. 9F.

As these data in FIGS. 9A-9G show, the processability of the inventive sample is feasible, as indicated by the lubricant thickness variations with the concentrations relative to the comparative example. Indeed, as these data confirm, an improved processing controllability/capability of the inventive lubricant may be provided. This is shown by the reduced circumferential thickness range (increased uniformity) and the decreased standard deviation of lube thickness.

Bonding Ratio Percentage and Surface Energy

Figure 10B:
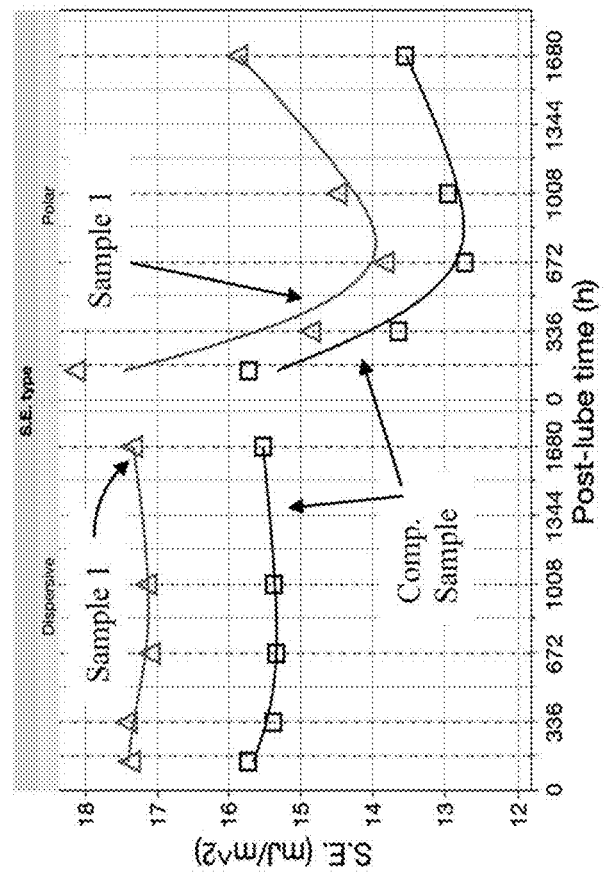
FIG. 10B is a graph showing the results of surface energy evaluations utilizing different lubricants according to one aspect of the disclosure.
Figure 10A:
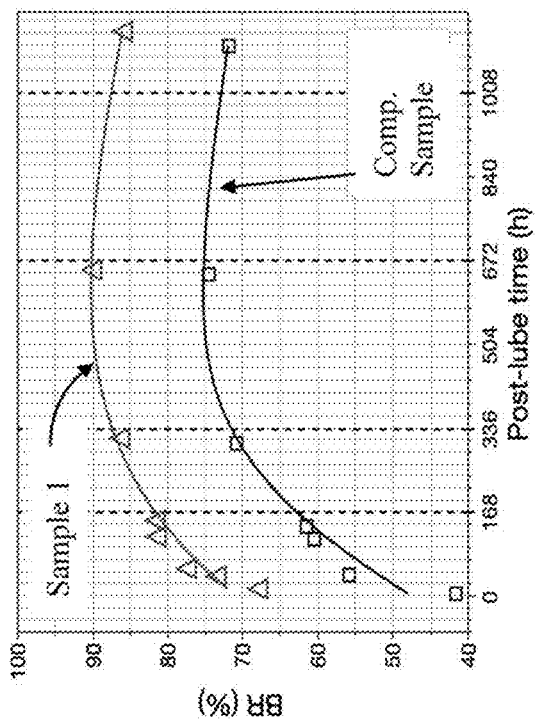
FIG. 10A is a graph showing the results of a bonding ratio percentage evaluation with time utilizing different lubricants according to one aspect of the disclosure.

The bonding ratio percentage and surface energy were determined according to known methods in the art. These data are shown in FIGS. 10A and 10B, respectively. As these data show, the exemplary lubricant reaches a higher saturated bonding ratio more quickly than the comparative example and also results in less surface coverage than the comparative example as evidenced by the higher surface energy results. This is surprising in view of the improved contamination robustness discussed herein suggesting the multi-dentate design in combination with the cyclic functional groups provide an enhanced ability to sequester contaminants without negatively affecting other performance properties.

Accordingly, the lubricants according to aspects of this disclosure demonstrate improved thermal stability/oxidation resistance, improved contamination robustness at sub-nanometer level, low profile for higher ADC with improved writability/readability, reasonable head wear and flyability performances, an improved bonding ratio, and improved processability/yields with an increased uniformity. The lubricants according to aspects of this disclosure are suitable for use in high-temperature applications while maintaining or improving mechanical interface integration robustness, reliability, and magnetic spacing.

The above description is made for the purpose of illustrating the general principles of the present disclosure and is not meant to limit the inventive concepts claimed herein. Further, particular features described herein can be used in combination with other described features in each of the various possible combinations and permutations.

It should be noted that in the development of any such actual aspect, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the device, system and/or method used/disclosed herein can also comprise some components other than those cited.

Unless otherwise specifically defined herein, all terms are to be given their broadest possible interpretation including meanings implied from the specification as well as meanings understood by those skilled in the art and/or as defined in dictionaries, treatises, and the like.

It must also be noted that, as used in the specification and the appended claims, the singular forms "a," "an" and "the" include plural referents unless otherwise specified.

As also used herein, the term "about" denotes an interval of accuracy that ensures the technical effect of the feature in question. In various approaches, the term "about" when combined with a value, refers to plus and minus 10% of the reference value. For example, a thickness of about 20 angstroms (Å) refers to a thickness of 20 Å+/−2 Å, e.g., from 18 Å to 22 Å in this example.

In the summary and this detailed description, each numerical value should be read once as modified by the term "about" (unless already expressly so modified), and then read again as not so modified unless otherwise indicated in context. Also, in the summary and this detailed description, it should be understood that a physical range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

As used in the specification and claims, "near" is inclusive of "at." The term "and/or" refers to both the inclusive "and" case and the exclusive "or" case, and such term is used herein for brevity. For example, a composition comprising "A and/or B" may comprise A alone, B alone, or both A and B.

Various components described in this specification may be described as "including" or made of certain materials or compositions of materials. In one aspect, this can mean that the component consists of the particular material(s). In another aspect, this can mean that the component comprises the particular material(s).

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. It is further noted that the term "over" as used in the present application in the context of one component located over another component, may be used to mean a component that is directly on another component and/or in another component (e.g., directly on a surface of a component or embedded in a component). Thus, for example, a first component that is over the second component may mean that (1) the first component is over the second component, but not directly touching the second component, (2) the first component is directly on (e.g., directly on a surface of) the second component, and/or (3) the first component is in (e.g., embedded in) the second component. The term "about 'value X'", or "approximately value X," as used in the disclosure shall mean within 10 percent of the 'value X'. For example, a value of about 1 or approximately 1 would mean a value in a range of 0.9-1.1. In the disclosure various ranges in values may be specified, described and/or claimed. It is noted that any time a range is specified, described and/or claimed in the specification and/or claim, it is meant to include the endpoints (at least in one embodiment). In another embodiment, the range may not include the endpoints of the range. In the disclosure various values (e.g., value X) may be specified, described and/or claimed. In one embodiment, it should be understood that the value X may be exactly equal to X. In one embodiment, it should be understood that the value X may be "about X," with the meaning noted above.

While various aspects have been described above, it should be understood that they have been presented by way of example only, and not limitation. Thus, the breadth and scope of an aspect of the present invention should not be limited by any of the above-described exemplary aspects, but should be defined only in accordance with the following claims and their equivalents.

What is claimed is:

1. A lubricant comprising: a plurality of segments according to general formula (I), (II), or (III):

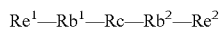 (I);

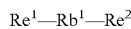 (II); or

 (III);

wherein Rc, when present, is a divalent linking segment comprising an anchoring functional group engageable with a protective overcoat of a magnetic recording media;

wherein each $Rb^1$ and $Rb^2$, when present, independently comprises a chain segment comprising at least one of a fluoroalkyl ether moiety, a fluoroalkenyl ether moiety, a perfluoroalkyl ether moiety, a perfluoroalkenyl ether moiety, or a combination thereof;

wherein each of $Re^1$ and $Re^2$ independently comprises a substituted or unsubstituted cyclic anchoring functional group engageable with the protective overcoat of a magnetic recording media;

wherein one or more of $Re^1$, $Re^2$, and Rc, independently comprises a cyclic functional group comprising at least one of an alicyclic $C_3$-$C_{50}$ alkyl radical, an alicyclic $C_3$-$C_{50}$ alkenyl radical, a heterocyclic $C_3$-$C_{50}$ radical, an aromatic $C_5$-$C_{50}$ radical, a polycyclic aromatic $C_{10}$-$C_{50}$ radical, a heteroaromatic $C_5$-$C_{50}$ radical, a cyclotriphosphazine radical, or a combination thereof;

wherein m is from 1 to 20; and wherein the unsubstituted cyclic anchoring functional group is selected from the group consisting of:

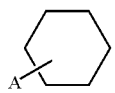 (IXa)

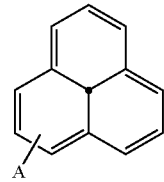 (XVIIa)

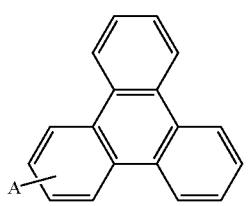 (VIIIa)

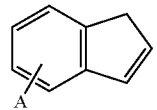 (XXa)

 (XXIXa)

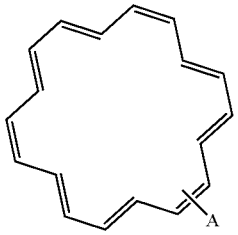 (XXXa)

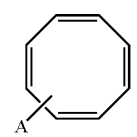 (XXXIa)

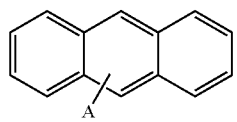 (XXXIIIa)

 (XXXVIa)

2. The lubricant of claim 1, wherein at least one anchoring functional group, at least one cyclic functional group, or a combination thereof, further comprises at least one of B, Si, a pnictogen, a chalcogen, a halogen, —OR*, —NR*$_2$, —NR*—CO—R*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$-SiR*$_3$, —(CF$_2$)$_q$-SiR*$_3$, or a combination thereof, wherein q is 1 to 10 and each R* is, independently, a hydrogen, B, Si, a pnictogen, a chalcogen, a halogen, a saturated $C_1$-$C_{50}$ radical, an unsaturated $C_2$-$C_{50}$ radical, an aromatic $C_4$-$C_{50}$ radical, a polycyclic aromatic $C_5$-$C_{50}$ radical, a heteroaromatic $C_5$-$C_{50}$ radical, an alicyclic $C_3$-$C_{50}$ radical, and/or a heterocyclic $C_2$-$C_{50}$ radical, and wherein two or more R* may join together to form a ring structure.

3. The lubricant of claim 1, wherein at least one anchoring functional group comprises a hydroxyl (—OH) moiety.

4. The lubricant of claim 1, wherein at least one cyclic functional group independently comprises a substituted or unsubstituted monovalent moiety comprising a formula selected from the group consisting of:
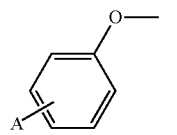
(IIa)
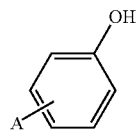
(IIIa)
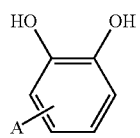
(IVa)
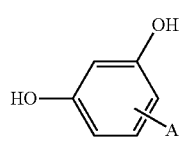
(Va)
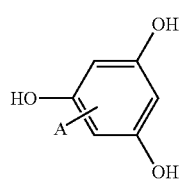
(VIa)
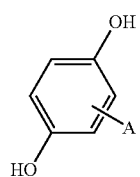
(VIIa)
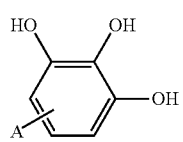
(VIIIa)
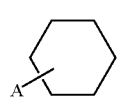
(IXa)
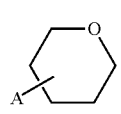
(Xa)
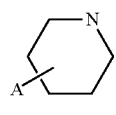
(XIa)
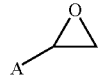
(XIIa)
-continued
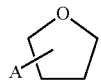
(XIIIa)
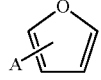
(XIVa)
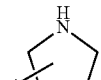
(XVa)
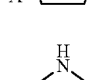
(XVIa)
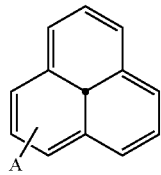
(XVIIa)
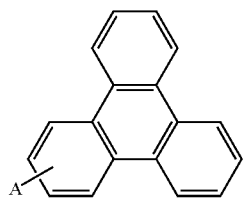
(XVIIIa)
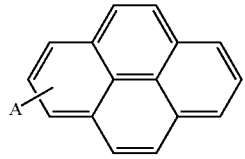
(XIXa)
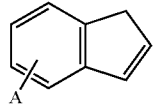
(XXa)
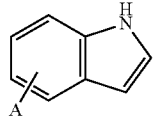
(XXIa)
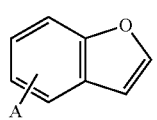
(XXIIa)
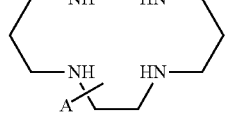
(XXIIIa)

-continued (XXIVa)
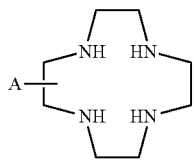

(XXVa)
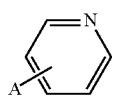

(XXVIa)
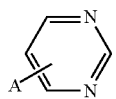

(XXVIIa)
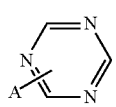

(XXVIIIa)
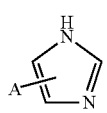

(XXIXa)
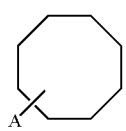

(XXXa)
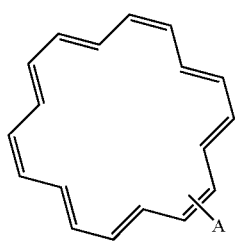

(XXXIa)
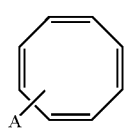

(XXXIIIa)
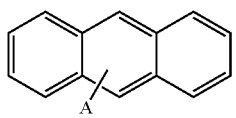

-continued (XXXIVa)
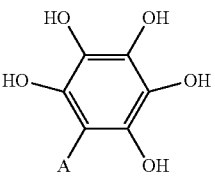

(XXXVa)
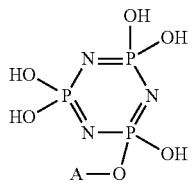

(XXXVIa)

or a combination thereof, wherein the moiety is bonded to a respective segment "A" at any substitutable position.

5. The lubricant of claim 4, wherein the cyclic functional group is further substituted with one or more functional groups comprising one or more of B, Si, a pnictogen, a chalcogen, a halogen, —OR*, —NR*$_2$, —NR*—CO—R*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$-SiR*$_3$, —(CF$_2$)$_q$-SiR*$_3$, or a combination thereof, wherein q is 1 to 10 and each R* is, independently, a hydrogen, B, Si, a pnictogen, a chalcogen, a halogen, a saturated C$_1$-C$_{50}$ radical, an unsaturated C$_2$-C$_{50}$ radical, an aromatic C$_4$-C$_{50}$ radical, a polycyclic aromatic C$_5$-C$_{50}$ radical, a heteroaromatic C$_5$-C$_{50}$ radical, an alicyclic C$_3$-C$_{50}$ radical, and/or a heterocyclic C$_2$-C$_{50}$ radical, and wherein two or more R* may join together to form a ring structure.

6. The lubricant of claim 1, wherein at least one cyclic functional group comprises at least one of a monovalent anisolyl radical, phenolic radical, resorcinolyl radical, catecholyl radical, hydroquinonyl radical, phloroglucinolyl radical, pyrogallolyl radical, phenalenyl radical, indolyl radical, adamantanyl radical, or a combination thereof.

7. The lubricant of claim 1, wherein Rc, when present, comprises general formula (IV):

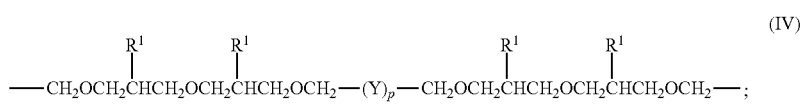

(IV)

wherein each Y independently comprises:
(i) —CH$_2$—;
(ii) —CF$_2$—;
(iii) —CHF—;
(iv) —CF$_2$CF$_2$CF$_2$O(CF$_2$CF$_2$CF$_2$CF$_2$O)$_a$CF$_2$CF$_2$CF$_2$—;
(v) —CF$_2$CF$_2$O(CF$_2$CF$_2$CF$_2$O)$_a$CF$_2$CF$_2$—;
(vi) —CF$_2$CF$_2$O[CF(CF$_3$)CF$_2$O]$_a$CF$_2$CF$_2$—;
(vii) —CF$_2$O(CF$_2$CF$_2$O)$_a$(CF$_2$O)$_b$CF$_2$—;
(viii) —CF$_2$O(CF$_2$CF$_2$O)$_a$CF$_2$—;
or a combination thereof;
wherein each a, when present, is independently from 1 to 20,
wherein each b, when present, is independently from 1 to 20;
wherein p is from 1 to 20; and
wherein R$^1$ is an anchoring functional group engageable with a protective overcoat of a magnetic recording media, comprising B, Si, a pnictogen, a chalcogen, a halogen, —OR*, —NR*$_2$, —NR*—CO—R*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$-SiR*$_3$, —(CF$_2$)$_q$-SiR*$_3$, or a combination thereof, wherein q is 1 to 10 and each R* is, independently, a hydrogen, B, Si, a pnictogen, a chalcogen, a halogen, a saturated C$_1$-C$_{50}$ radical, an unsaturated C$_2$-C$_{50}$ radical, an aromatic C$_4$-C$_{50}$ radical, a polycyclic aromatic C$_5$-C$_{50}$ radical, a heteroaromatic C$_5$-C$_{50}$ radical, an alicyclic C$_3$-C$_{50}$ radical, and/or a heterocyclic C$_2$-C$_{50}$ radical, and wherein two or more R* may join together to form a ring structure.

8. The lubricant of claim 7, wherein R$^1$ is a cyclic functional group comprising an alicyclic C$_3$-C$_{50}$ alkyl radical, an alicyclic C$_3$-C$_{50}$ alkenyl radical, a heterocyclic C$_3$-C$_{50}$ radical, an aromatic C$_5$-C$_{50}$ radical, a polycyclic aromatic C$_{10}$-C$_{50}$ radical, a heteroaromatic C$_5$-C$_{50}$ radical, a cyclotriphosphazine radical, or a combination thereof.

9. The lubricant of claim 8, wherein at least one cyclic functional group further comprises B, Si, a pnictogen, a chalcogen, a halogen, —OR*, —NR*$_2$, —NR*—CO—R*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$-SiR*$_3$, —(CF$_2$)$_q$-SiR*$_3$, or a combination thereof, wherein q is 1 to 10 and each R* is, independently, a hydrogen, B, Si, a pnictogen, a chalcogen, a halogen, a saturated C$_1$-C$_{50}$ radical, an unsaturated C$_2$-C$_{50}$ radical, an aromatic C$_4$-C$_{50}$ radical, a polycyclic aromatic C$_5$-C$_{50}$ radical, a heteroaromatic C$_5$-C$_{50}$ radical, an alicyclic C$_3$-C$_{50}$ radical, and/or a heterocyclic C$_2$-C$_{50}$ radical, and wherein two or more R* may join together to form a ring structure.

10. The lubricant of claim 8, wherein R$^1$ comprises a hydroxyl moiety (—OH).

11. The lubricant of claim 1, wherein Rc, when present, comprises general formula (V):

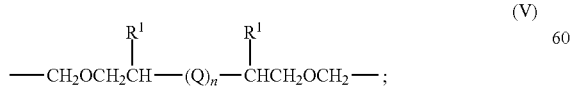

(V)

wherein each Q independently comprises:
(i) —CH$_2$—;
(ii) —CF$_2$—;
(iii) —CHF—;
(iv) —CF$_2$CF$_2$CF$_2$O(CF$_2$CF$_2$CF$_2$CF$_2$O)$_a$CF$_2$CF$_2$CF$_2$—;
(v) —CF$_2$CF$_2$O(CF$_2$CF$_2$CF$_2$O)$_a$CF$_2$CF$_2$—;
(vi) —CF$_2$CF$_2$O[CF(CF$_3$)CF$_2$O]$_a$CF$_2$CF$_2$—;
(vii) —CF$_2$O(CF$_2$CF$_2$O)$_a$(CF$_2$O)$_b$CF$_2$—;
(viii) —CF$_2$O(CF$_2$CF$_2$O)$_a$CF$_2$—;
or a combination thereof;
wherein each a, when present, is independently from 1 to 20,
wherein each b, when present, is independently from 1 to 20;
wherein n is from 1 to 20; and
wherein R$^1$ is an anchoring functional group engageable with a protective overcoat of a magnetic recording media, comprising —OH, B, Si, a pnictogen, a chalcogen, a halogen, —OR*, —NR*$_2$, —NR*—CO—R*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$-SiR*$_3$, —(CF$_2$)$_q$-SiR*$_3$, or a combination thereof, wherein q is 1 to 10 and each R* is, independently, a hydrogen, B, Si, a pnictogen, a chalcogen, a halogen, a saturated C$_1$-C$_{50}$ radical, an unsaturated C$_2$-C$_{50}$ radical, an aromatic C$_4$-C$_{50}$ radical, a polycyclic aromatic C$_5$-C$_{50}$ radical, a heteroaromatic C$_5$-C$_{50}$ radical, an alicyclic C$_3$-C$_{50}$ radical, and/or a heterocyclic C$_2$-C$_{50}$ radical, wherein two or more R* may join together to form a ring structure, or R$^1$ is a cyclic functional group including at least one of an alicyclic C$_3$-C$_{50}$ alkyl radical, an alicyclic C$_3$-C$_{50}$ alkenyl radical, a heterocyclic C$_3$-C$_{50}$ radical, an aromatic C$_5$-C$_{50}$ radical, a polycyclic aromatic C$_{10}$-C$_{50}$ radical, a heteroaromatic C$_5$-C$_{50}$ radical, a cyclotriphosphazine radical, or a combination thereof.

12. The lubricant of claim 11, wherein at least one cyclic functional group further comprises B, Si, a pnictogen, a chalcogen, a halogen, —OR*, —NR*$_2$, —NR*—CO—R*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$-SiR*$_3$, —(CF$_2$)$_q$-SiR*$_3$, or a combination thereof, wherein q is 1 to 10 and each R* is, independently, a hydrogen, B, Si, a pnictogen, a chalcogen, a halogen, a saturated C$_1$-C$_{50}$ radical, an unsaturated C$_2$-C$_{50}$ radical, an aromatic C$_4$-C$_{50}$ radical, a polycyclic aromatic C$_5$-C$_{50}$ radical, a heteroaromatic C$_5$-C$_{50}$ radical, an alicyclic C$_3$-C$_{50}$ radical, and/or a heterocyclic C$_2$-C$_{50}$ radical, and wherein two or more R* may join together to form a ring structure.

13. The lubricant of claim 1, wherein Rc, when present, comprises an ester functional group comprising general formula (VI), (VII), or a combination thereof:

(VI)

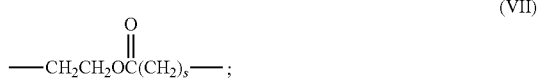

(VII)

wherein t, when present, is from 1 to 20; and
wherein s, when present, is from 1 to 20.

14. The lubricant of claim 1, wherein $Rb^1$, and $Rb^2$ when present, comprises the formula:
- (iv) $-CF_2CF_2CF_2O(CF_2CF_2CF_2CF_2O)_aCF_2CF_2CF_2-$;
- (v) $-CF_2CF_2O(CF_2CF_2CF_2O)_aCF_2CF_2-$;
- (vi) $-CF_2CF_2O[CF(CF_3)CF_2O]_aCF_2CF_2-$;
- (vii) $-CF_2O(CF_2CF_2O)_a(CF_2O)_bCF_2-$;
- (viii) $-CF_2O(CF_2CF_2O)_aCF_2-$;
- or a combination thereof;
- wherein each a is, independently from 1 to 20, and
- wherein each b, when present, is independently from 1 to 20.

15. The lubricant of claim 1, wherein each of $Re^1$ and $Re^2$ independently comprises general formula (VIII):

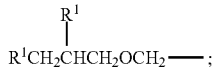

(VIII)

wherein $R^1$ is an anchoring functional group engageable with a protective overcoat of a magnetic recording medium, comprising —OH B, Si, a pnictogen, a chalcogen, a halogen, —OR*, —NR*$_2$, —NR*—CO—R*, —O—CO—R*, —CO—O—R*, —SeR*, —TeR*, —PR*$_2$, —PO—(OR*)$_2$, —O—PO—(OR*)$_2$, —N=P(NR*$_2$)$_3$, —AsR*$_2$, —SR*, —SO$_2$—(OR*)$_2$, —BR*$_2$, —SiR*$_3$, —(CH$_2$)$_q$-SiR*$_3$, —(CF$_2$)$_q$-SiR*$_3$, or a combination thereof, wherein q is 1 to 10 and each R* is, independently, a hydrogen, B, Si, a pnictogen, a chalcogen, a halogen, a saturated $C_1$-$C_{50}$ radical, an unsaturated $C_2$-$C_{50}$ radical, an aromatic $C_4$-$C_{50}$ radical, a polycyclic aromatic $C_5$-$C_{50}$ radical, a heteroaromatic $C_5$-$C_{50}$ radical, an alicyclic $C_3$-$C_{50}$ radical, and/or a heterocyclic $C_2$-$C_{50}$ radical, wherein two or more R* may join together to form a ring structure; or wherein $R^1$ is a cyclic functional group comprising an alicyclic $C_3$-$C_{50}$ alkyl radical, an alicyclic $C_3$-$C_{50}$ alkenyl radical, a heterocyclic $C_3$-$C_{50}$ radical, an aromatic $C_5$-$C_{50}$ radical, a polycyclic aromatic $C_{10}$-$C_{50}$ radical, a heteroaromatic $C_5$-$C_{50}$ radical, a cyclotriphosphazine radical, or a combination thereof.

16. The lubricant of claim 1, comprising general formula (IX):

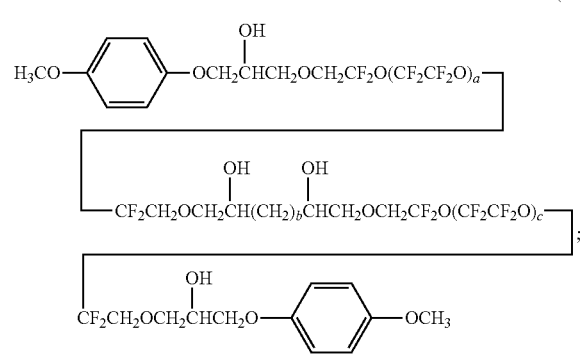

wherein a is from 1 to 20; b is from 1 to 20; and c is from 1 to 20.

17. The lubricant of claim 1, comprising general formula (X):

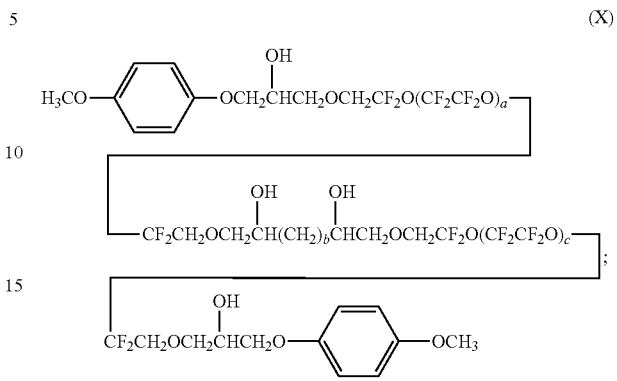

wherein a is from 1 to 20; b is from 1 to 20; and c is from 1 to 20.

18. A magnetic recording medium, comprising:
a magnetic recording layer on a substrate;
a protective overcoat on the magnetic recording layer; and
a lubricant layer comprising the lubricant according to claim 1 on the protective overcoat,
wherein the lubricant has a bonding percentage of about 20% to less than about 100%, corresponding to a degree of bonding of the lubricant to the total area of an upper surface of the protective overcoat.

19. The lubricant according to claim 1, comprising a weight average molecular weight from about 0.1 to 20 kiloDaltons (kDa), a polydispersity of greater than or equal to about 1 and less than or equal to about 2 and a dewetting thickness of less than or equal to about 10 nanometers.

20. A method of synthesizing a lubricant comprising:
reacting a perfluoroalkyl compound with an aromatic compound, to yield a compound comprising a plurality of segments according to general formula (I), (II), or (III):

$$Re^1—Rb^1—Rc—Rb^2—Re^2 \quad (I);$$

$$Re^1—Rb^1—Re^2 \quad (II);\ \text{or}$$

$$Re^1—Rb^1\text{-}(Rc\text{-}Rb^2)_m—Re^2 \quad (III);$$

wherein Rc, when present, is a divalent linking segment comprising an anchoring functional group engageable with a protective overcoat of a magnetic recording medium;

wherein each $Rb^1$ and $Rb^2$, when present, independently comprises a chain segment comprising at least one of a fluoroalkyl ether moiety, a fluoroalkenyl ether moiety, a perfluoroalkyl ether moiety, a perfluoroalkenyl ether moiety, or a combination thereof;

wherein each of $Re^1$ and $Re^2$ independently comprises a substituted or unsubstituted cyclic anchoring functional group engageable with a protective overcoat of a magnetic recording media;

wherein one or more of $Re^1$, $Re^2$ and Rc independently comprises a cyclic functional group comprising at least one of an alicyclic $C_3$-$C_{50}$ alkyl radical, an alicyclic $C_3$-$C_{50}$ alkenyl radical, a heterocyclic $C_3$-$C_{50}$ radical, an aromatic $C_5$-$C_{50}$ radical, a polycyclic aromatic $C_{10}$-$C_{50}$ radical, a heteroaromatic $C_5$-$C_{50}$ radical, a cyclotriphosphazine radical, or a combination thereof;

wherein m is from 1 to 20; and
wherein the unsubstituted cyclic anchoring functional group is selected from the group consisting of:
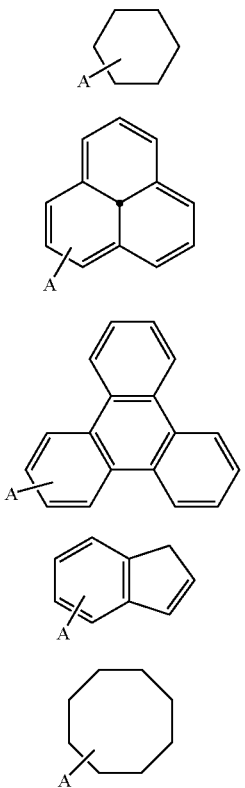
(IXa)
(XVIIa)
(VIIIa)
(XXa)
(XXIXa)
-continued
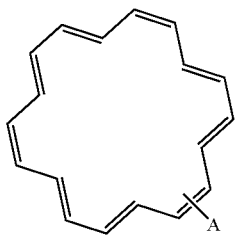
(XXXa)
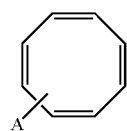
(XXXIa)
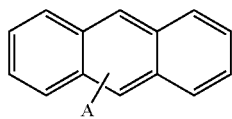
(XXXIIIa)
(XXXVIa)
* * * * *